United States Patent
Wang et al.

(10) Patent No.: US 12,177,852 B2
(45) Date of Patent: *Dec. 24, 2024

(54) SYSTEM AND METHOD FOR MAPPING UPLINK CONTROL INFORMATION

(71) Applicant: QUALCOMM Incorporated, San Diego, CA (US)

(72) Inventors: Renqiu Wang, San Diego, CA (US); Hao Xu, Beijing (CN); Wei Zeng, Saratoga, CA (US); Seyong Park, San Diego, CA (US); Wanshi Chen, San Diego, CA (US); Peter Gaal, San Diego, CA (US); Tingfang Ji, San Diego, CA (US)

(73) Assignee: QUALCOMM Incorporated, San Diego, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 17/810,961

(22) Filed: Jul. 6, 2022

(65) Prior Publication Data

US 2022/0346121 A1 Oct. 27, 2022

Related U.S. Application Data

(63) Continuation of application No. 15/687,388, filed on Aug. 25, 2017, now Pat. No. 11,412,534.

(Continued)

(51) Int. Cl.
*H04W 72/21* (2023.01)
*H04B 7/06* (2006.01)
(Continued)

(52) U.S. Cl.
CPC .......... *H04W 72/21* (2023.01); *H04B 7/0632* (2013.01); *H04L 1/1861* (2013.01);
(Continued)

(58) Field of Classification Search
CPC ... H04W 72/21; H04W 52/36; H04W 52/365; H04W 72/0453; H04W 76/27;
(Continued)

(56) References Cited

U.S. PATENT DOCUMENTS 9,198,141 B2 11/2015 Papasakellariou et al.
10,257,807 B2 4/2019 Yi et al.
(Continued)

FOREIGN PATENT DOCUMENTS

CN 101984569 A 3/2011
CN 102231719 A 11/2011
(Continued)

OTHER PUBLICATIONS

Chenglong H., et al., "LTE—A System PUSCH Channel Research," Digital Technology and Application, Aug. 15, 2013, the whole document.

(Continued)

*Primary Examiner* — Harry H Kim
(74) *Attorney, Agent, or Firm* — Guang Yu Zhang; ArentFox Schiff LLP

(57) ABSTRACT

A user equipment (UE) may map a demodulation reference signal (DMRS) sequence to a first symbol in a set of resource blocks (RBs) of an uplink long burst, and the first symbol may occur at the beginning of the uplink long burst. The DMRS sequence may be "front-loaded" in the uplink long burst. The DMRS sequence may be dependent upon RB locations. When the DMRS sequence is mapped to the beginning of an uplink long burst, uplink control information (UCI) may be mapped in a physical uplink shared channel (PUSCH). A UE may map UCI in a PUSCH after the DMRS sequence is mapped to the beginning of the uplink long burst. When the base station receives an uplink long burst including the front-loaded DMRS and the UCI (Continued)

mapped in the PUSCH, the base station may identify the DMRS for channel estimation/interference cancelation of the UCI carried on the PUSCH.

27 Claims, 18 Drawing Sheets

Related U.S. Application Data

(60) Provisional application No. 62/418,079, filed on Nov. 4, 2016.

(51) Int. Cl.
| | | |
|---|---|---|
| *H04L 1/00* | (2006.01) | |
| *H04L 1/1829* | (2023.01) | |
| *H04L 5/00* | (2006.01) | |
| *H04W 52/36* | (2009.01) | |
| *H04W 72/0453* | (2023.01) | |
| *H04W 76/27* | (2018.01) | |

(52) U.S. Cl.
CPC .......... *H04L 5/0048* (2013.01); *H04L 5/0051* (2013.01); *H04L 5/0055* (2013.01); *H04L 5/0057* (2013.01); *H04W 52/36* (2013.01); *H04W 52/365* (2013.01); *H04W 72/0453* (2013.01); *H04L 1/0026* (2013.01); *H04L 1/0073* (2013.01); *H04L 5/0007* (2013.01); *H04L 5/001* (2013.01); *H04W 76/27* (2018.02)

(58) Field of Classification Search
CPC ... H04B 7/0632; H04L 1/1861; H04L 5/0048; H04L 5/0051; H04L 5/0055; H04L 5/0057; H04L 1/0026; H04L 1/0073; H04L 5/0007; H04L 5/001
See application file for complete search history.

(56) References Cited

U.S. PATENT DOCUMENTS

| | | | |
|---|---|---|---|
| 10,701,723 B2 | 6/2020 | Wang et al. | |
| 11,412,534 B2* | 8/2022 | Wang | H04W 72/0453 |
| 11,569,880 B2* | 1/2023 | Lee | H04B 7/0626 |
| 2008/0117867 A1 | 5/2008 | Yin et al. | |
| 2010/0046356 A1 | 2/2010 | Chun et al. | |
| 2010/0157918 A1 | 6/2010 | Kim, II et al. | |
| 2011/0110357 A1 | 5/2011 | Chung et al. | |
| 2012/0008556 A1 | 1/2012 | Noh et al. | |
| 2012/0082079 A1* | 4/2012 | Luo | H04L 5/0053 370/311 |
| 2012/0250656 A1 | 10/2012 | Noh et al. | |
| 2013/0039197 A1 | 2/2013 | Pan et al. | |
| 2013/0107985 A1* | 5/2013 | Jang | H04B 7/0632 375/295 |
| 2013/0114756 A1 | 5/2013 | Jia et al. | |
| 2013/0117622 A1 | 5/2013 | Blankenship et al. | |
| 2014/0219202 A1 | 8/2014 | Kim et al. | |
| 2015/0156764 A1 | 6/2015 | Yang et al. | |
| 2015/0249980 A1 | 9/2015 | You et al. | |
| 2015/0312009 A1 | 10/2015 | Nissila et al. | |
| 2016/0100398 A1* | 4/2016 | Xia | H04L 5/0007 370/330 |
| 2016/0127093 A1 | 5/2016 | Jiang et al. | |
| 2016/0211959 A1 | 7/2016 | Jongren et al. | |
| 2016/0212731 A1 | 7/2016 | Zhang et al. | |
| 2016/0278049 A1 | 9/2016 | Nory et al. | |
| 2016/0360518 A1 | 12/2016 | Noh et al. | |
| 2017/0005772 A1 | 1/2017 | Takeda et al. | |
| 2017/0238272 A1 | 8/2017 | You et al. | |
| 2017/0374675 A1* | 12/2017 | Hwang | H04W 72/04 |
| 2018/0131485 A1 | 5/2018 | Wang et al. | |
| 2018/0132269 A1 | 5/2018 | Wang et al. | |
| 2018/0191423 A1 | 7/2018 | Qu et al. | |
| 2018/0242286 A1 | 8/2018 | Song et al. | |
| 2019/0037585 A1* | 1/2019 | Li | H04L 1/0071 |
| 2019/0089439 A1* | 3/2019 | Shimomura | H04B 17/336 |
| 2019/0223201 A1* | 7/2019 | Lee | H04L 5/0053 |
| 2019/0373597 A1* | 12/2019 | Bendlin | H04L 5/0051 |
| 2020/0137748 A1 | 4/2020 | Lindqvist et al. | |
| 2020/0214024 A1* | 7/2020 | Lee | H04L 5/0055 |
| 2020/0367173 A1* | 11/2020 | Ryu | H04W 76/27 |
| 2021/0185706 A1* | 6/2021 | Park | H04J 13/004 |
| 2021/0282169 A1* | 9/2021 | Zhang | H04W 72/56 |

FOREIGN PATENT DOCUMENTS

| | | |
|---|---|---|
| CN | 102812658 A | 12/2012 |
| CN | 105191464 A | 12/2015 |
| EP | 3236610 A1 | 10/2017 |
| EP | 3468081 A1 | 4/2019 |
| JP | 2013505621 A | 2/2013 |
| JP | 2016521098 A | 7/2016 |
| KR | 20160017052 A | 2/2016 |
| WO | 2011053836 A2 | 5/2011 |
| WO | 2014201614 A1 | 12/2014 |
| WO | 2016099135 A1 | 6/2016 |
| WO | 2016148835 A1 | 9/2016 |
| WO | 2017019132 A1 | 2/2017 |
| WO | 2017035808 A1 | 3/2017 |
| WO | 2018128453 A1 | 7/2018 |

OTHER PUBLICATIONS

Ericsson: "Concatenated Block RS Design", 3GPP TSG-RAN WG1#86bis, R1-1609772, Lisbon, Portugal Oct. 10-14, 2016, 3 Pages.
Ericsson: "Demodulation Reference Signal Design Principles", 3GPP TSG-RAN WG1 #86bin, R1-1609767, Lisbon, Portugal, Oct. 10-14, 2016, 4 Pages.
Ericsson: "On Cyclic Shifts for UL DMRS with IFDMA", 3GPP TSG-RAN WG1#86bis, R1-1609848, Lisbon, Portugal, Oct. 10-14, 2016, 4 Pages.
International Search Report and Written Opinion—PCT/US2017/050955—ISA/EPO—Apr. 16, 2018.
International Preliminary Report on Patentability—PCT/US2017/048975, The International Bureau of WIPO—Geneva, Switzerland, May 16, 2019.
International Preliminary Report on Patentability—PCT/US2017/050955, The International Bureau of WIPO—Geneva, Switzerland, May 16, 2019.
International Search Report and Written Opinion—PCT/US2017/048975—ISA/EPO—Dec. 11, 2017.
Partial International Search Report—PCT/US2017/050955—ISA/EPO—Feb. 7, 2018.
Qualcomm Incorporated: "PUSCH Design Options," 3GPP TSG RAN WG1 #82 BIS, R1-155707, Oct. 5-9, 2015, Oct. 9, 2015, Malmö, Sweden, 4 pages.
Qualcomm Incorporated: "UL Reference Signal Design for eMBB with CP-OFDM and DFT-s-OFDM", 3GPP TSG-RAN WG1 #86, R1-1610115, [Search Jul. 18, 2021], Oct. 10-14, 2016, (Oct. 14, 2016), 3 Pages, Oct. 1, 2016, Internet URL: https://www.3gpp.org/ftp/TSG_RAN/WG1_RL1/TSGR1_86b/Docs/R1-1610115.zip.
ZTE: "Signalling for Inter-eNB Operation", 3GPP TSG-RAN WG1 Meeting #74, R1-133050, Barcelona, Spain, Aug. 19-23, 2013, pp. 1-4.

* cited by examiner

SYSTEM AND METHOD FOR MAPPING UPLINK CONTROL INFORMATION

CROSS-REFERENCE TO RELATED APPLICATION(S)

This application is a continuation of U.S. patent application Ser. No. 15/687,388 titled "SYSTEM AND METHOD FOR MAPPING UPLINK CONTROL INFORMATION", filed Aug. 25, 2017. which claims the benefit of U.S. Provisional Application Ser. No. 62/418,079, entitled "DEMODULATION REFERENCE SIGNAL WITH LOW PEAK-TO-AVERAGE POWER RATIO" and filed on Nov. 4, 2016, which is expressly incorporated by reference herein in its entirety.

BACKGROUND

Field

The present disclosure relates generally to communication systems, and more particularly, to a user equipment configured for mapping uplink control information.

Background

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In various aspects, a user equipment (UE) may be configured to send, in an uplink burst, a demodulation reference signal (DMRS) sequence to a base station. The DMRS sequence may be used for channel estimation, for example, in association with demodulation of a physical uplink shared channel (PUSCH). The DMRS sequence may be a Zadoff-Chu (ZC) sequence or may be a segment of a ZC sequence.

The UE may be configured to map the DMRS sequence to a first symbol in a set of resource blocks (RBs) of an uplink burst, and the first symbol may occur at the beginning of the uplink burst. In other words, the DMRS sequence may be "front-loaded" in the uplink burst. Accordingly, the DMRS sequence may be dependent upon RB locations, e.g., as opposed to dependent upon length (i.e., number of RBs).

The location-dependent DMRS sequence may allow a base station to quickly identify the DMRS sequence—e.g., when the base station knows the RB index of the beginning of the DMRS sequence, the base station 402 may quickly identify the DMRS sequence. Therefore, the base station 402 may perform interference estimation and cancellation more quickly, for example, than if a length-dependent DMRS sequence were used. Additionally, mapping the DMRS sequence to the first symbol in a set of RBs of the uplink burst may reduce turnaround (e.g., between uplink and downlink subframes) experienced by the base station.

While the DMRS sequence may be mapped to the beginning of an uplink burst, uplink control information (UCI) may be mapped in a PUSCH. For example, a UE may map UCI in a PUSCH after the DMRS sequence is mapped to the beginning of the uplink burst. When the base station receives an uplink burst including the front-loaded DMRS and the UCI mapped in the PUSCH, the base station may quickly identify the DMRS for channel estimation/interference cancelation of the UCI carried on the PUSCH.

In an aspect of the disclosure, a first method, a first computer-readable medium, and a first apparatus are provided. The first apparatus may be a UE. The first apparatus may map a DMRS sequence to at least a first symbol in a set of RBs of an uplink long burst, and the first symbol may occur at a beginning of the uplink long burst. The first apparatus may map UCI in a PUSCH of the uplink long burst after the mapping of the DMRS sequence, and the UCI may include at least one of a channel quality indicator (CQI), acknowledgment/non-acknowledgement (ACK/NACK) feedback, or a rank indicator (RI). The first apparatus may send the uplink long burst including the mapped UCI. In an aspect, the first apparatus may map the UCI in the PUSCH by mapping the CQI in the PUSCH on a frequency-basis. In an aspect, the CQI is mapped to an end of the PUSCH. In an aspect, the first apparatus may map the UCI in the PUSCH by mapping the CQI in the PUSCH on a time-basis. In an aspect, the CQI is mapped to a beginning of the PUSCH. In an aspect, the first apparatus may map the UCI in the PUSCH by mapping at least one of the ACK/NACK feedback or the RI in the PUSCH on a frequency-basis. In an aspect, the first apparatus may map the UCI in the PUSCH by mapping the ACK/NACK feedback or the RI in the PUSCH on a time-basis. In an aspect, the RI is mapped after the ACK/NACK feedback. In an aspect, at least one of the ACK/NACK feedback or the RI is mapped after the CQI in the PUSCH. In an aspect, the CQI is mapped to a first set of symbols in the PUSCH and the ACK/NACK feedback is mapped to a second set of symbols in the PUSCH, the second set of symbols immediately following the first set of symbols. In an aspect, the PUSCH is punctured from a beginning of the PUSCH with at least one of the ACK/NACK feedback or the RI. In an aspect, data in the PUSCH is rate-matched around at least one of the ACK/NACK feedback or the RI. In an aspect, the PUSCH includes at least one of a cyclic prefix (CP) orthogonal frequency division multiplex (OFDM) waveform or a single carrier (SC) OFDM waveform. In an aspect, a discrete Fourier transform (DFT) is applied to one or more symbols of the uplink burst for the SC-OFDM waveform.

In an aspect of the disclosure, a second method, a second computer-readable medium, and a second apparatus are provided. The second apparatus may be a base station. The second apparatus may receive, from a UE, an uplink long burst. The second apparatus may detect, in the received uplink long burst, a DMRS sequence mapped to at least a first symbol in a set of RBs of the uplink long burst, and the first symbol may occur at a beginning of the uplink long burst. The second apparatus may detect, in the received uplink long burst, UCI mapped in a PUSCH of the uplink long burst, and the UCI may include at least one of a CQI, ACK/NACK feedback, or an RI. In an aspect, the CQI is mapped in the PUSCH on a time-basis. In an aspect, the CQI is mapped in the PUSCH on a frequency-basis. In an aspect, at least one of the ACK/NACK feedback or the RI is mapped in the PUSCH on a time-basis. In an aspect, at least one of the ACK/NACK feedback or the RI is mapped in the PUSCH on a frequency basis. In an aspect, the PUSCH is punctured from a beginning of the PUSCH with at least one of the ACK/NACK feedback or the RI.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

DETAILED DESCRIPTION

Figure 1:
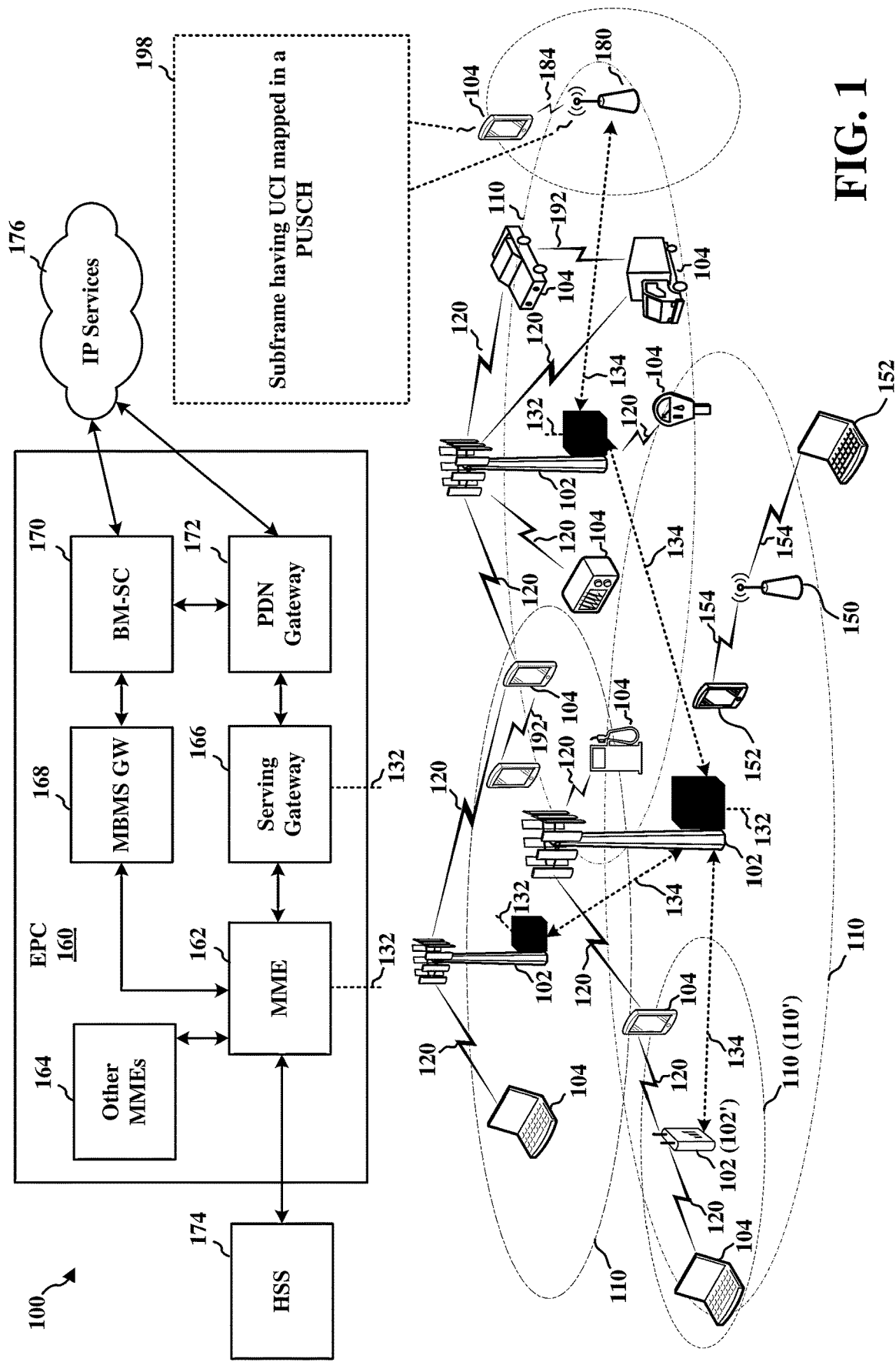
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EE-PROM), optical disk storage, magnetic disk storage, other magnetic storage devices, combinations of the aforementioned types of computer-readable media, or any other medium that can be used to store computer executable code in the form of instructions or data structures that can be accessed by a computer.

FIG. 1 is a diagram illustrating an example of a wireless communications system and an access network 100. The wireless communications system (also referred to as a wireless wide area network (WWAN)) includes base stations 102, UEs 104, and an Evolved Packet Core (EPC) 160. The base stations 102 may include macro cells (high power cellular base station) and/or small cells (low power cellular base station). The macro cells include base stations. The small cells include femtocells, picocells, and microcells.

The base stations 102 (collectively referred to as Evolved Universal Mobile Telecommunications System (UMTS) Terrestrial Radio Access Network (E-UTRAN)) interface with the EPC 160 through backhaul links 132 (e.g., S1 interface). In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160) with each other over backhaul links 134 (e.g., X2 interface). The backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macro cells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100 MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or less carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 192. The D2D communication link 192 may use the DL/UL WWAN spectrum. The D2D communication link 192 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, FlashLinQ, WiMedia, Bluetooth, ZigBee, Wi-Fi based on the IEEE 802.11 standard, LTE, or NR.

The wireless communications system may further include a Wi-Fi access point (AP) 150 in communication with Wi-Fi stations (STAs) 152 via communication links 154 in a 5 GHz unlicensed frequency spectrum. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same 5 GHz unlicensed frequency spectrum as used by the Wi-Fi AP 150. The small cell 102', employing NR in an unlicensed frequency spectrum, may boost coverage to and/or increase capacity of the access network.

The gNodeB (gNB) 180 may operate in millimeter wave (mmW) frequencies and/or near mmW frequencies in communication with the UE 104. When the gNB 180 operates in mmW or near mmW frequencies, the gNB 180 may be referred to as an mmW base station. Extremely high frequency (EHF) is part of the RF in the electromagnetic spectrum. EHF has a range of 30 GHz to 300 GHz and a wavelength between 1 millimeter and 10 millimeters. Radio waves in the band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW/near mmW radio frequency band has extremely high path loss and a short range. The mmW base station 180 may utilize beamforming 184 with the UE 104 to compensate for the extremely high path loss and short range.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The base station may also be referred to as a gNB, Node B, evolved Node B (eNB), an access point, a base transceiver station, a radio base station, a radio transceiver, a transceiver function, a basic service set (BSS), an extended service set (ESS), or some other suitable terminology. The base station 102 provides an access point to the EPC 160 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a toaster, or any other similar functioning device. Some of the UEs 104 may be referred to as IoT devices (e.g., parking meter, gas pump, toaster, vehicles, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Referring again to FIG. 1, in certain aspects, the UE 104 may map a demodulation reference signal (DMRS) sequence to at least a first symbol in a set of resource blocks (RBs) of an uplink long burst 198, and the first symbol may occur at a beginning of the uplink long burst 198. The UE 104 may map uplink control information (UCI) in a physical uplink shared channel (PUSCH) of the uplink long burst 198 after the mapping of the DMRS sequence, and the UCI including at least one of a channel quality indicator (CQI), acknowledgment/non-acknowledgement (ACK/NACK) feedback, or a rank indicator (RI). The UE 104 may send the uplink long burst 198 including the mapped UCI. In an aspect, the UE 104 may map the UCI in the PUSCH by mapping the CQI in the PUSCH on a frequency-basis. In an aspect, the CQI is mapped to an end of the PUSCH. In an aspect, the UE 104 may map the UCI in the PUSCH by mapping the CQI in the PUSCH on a time-basis. In an aspect, the CQI is mapped to a beginning of the PUSCH. In an aspect, the UE 104 may map the UCI in the PUSCH by mapping at least one of the ACK/NACK feedback or the RI in the PUSCH on a frequency-basis. In an aspect, the UE 104 may map the UCI in the PUSCH by mapping the ACK/NACK feedback or the RI in the PUSCH on a time-basis. In an aspect, the RI is mapped after the ACK/NACK feedback. In an aspect, at least one of the ACK/NACK feedback or the RI is mapped after the CQI in the PUSCH. In an aspect, the CQI is mapped to a first set of symbols in the PUSCH and the ACK/NACK feedback is mapped to a second set of symbols in the PUSCH, the second set of symbols immediately following the first set of symbols. In an aspect, the PUSCH is punctured from a beginning of the PUSCH with at least one of the ACK/NACK feedback or the RI. In an aspect, data in the PUSCH is rate-matched around at least one of the ACK/NACK feedback or the RI. In an aspect, the PUSCH comprises at least one of a cyclic prefix (CP) orthogonal frequency division multiplex (OFDM) waveform or a single carrier (SC) OFDM waveform. In an aspect, the UE 104 may apply a discrete Fourier transform (DFT) to one or more symbols of the uplink burst for the SC-OFDM waveform.

The base station 180 may receive, from the UE 104, the uplink long burst 198. The base station 180 may detect, in the received uplink long burst 198, the DMRS sequence mapped to at least a first symbol in a set of RBs of the uplink long burst 198, and the first symbol may occur at the beginning of the uplink long burst 198. The base station 180 may detect, in the received uplink long burst 198, UCI mapped in a PUSCH of the uplink long burst 198, and the UCI may include at least one of a CQI, ACK/NACK feedback, or an RI.

Figure 2:
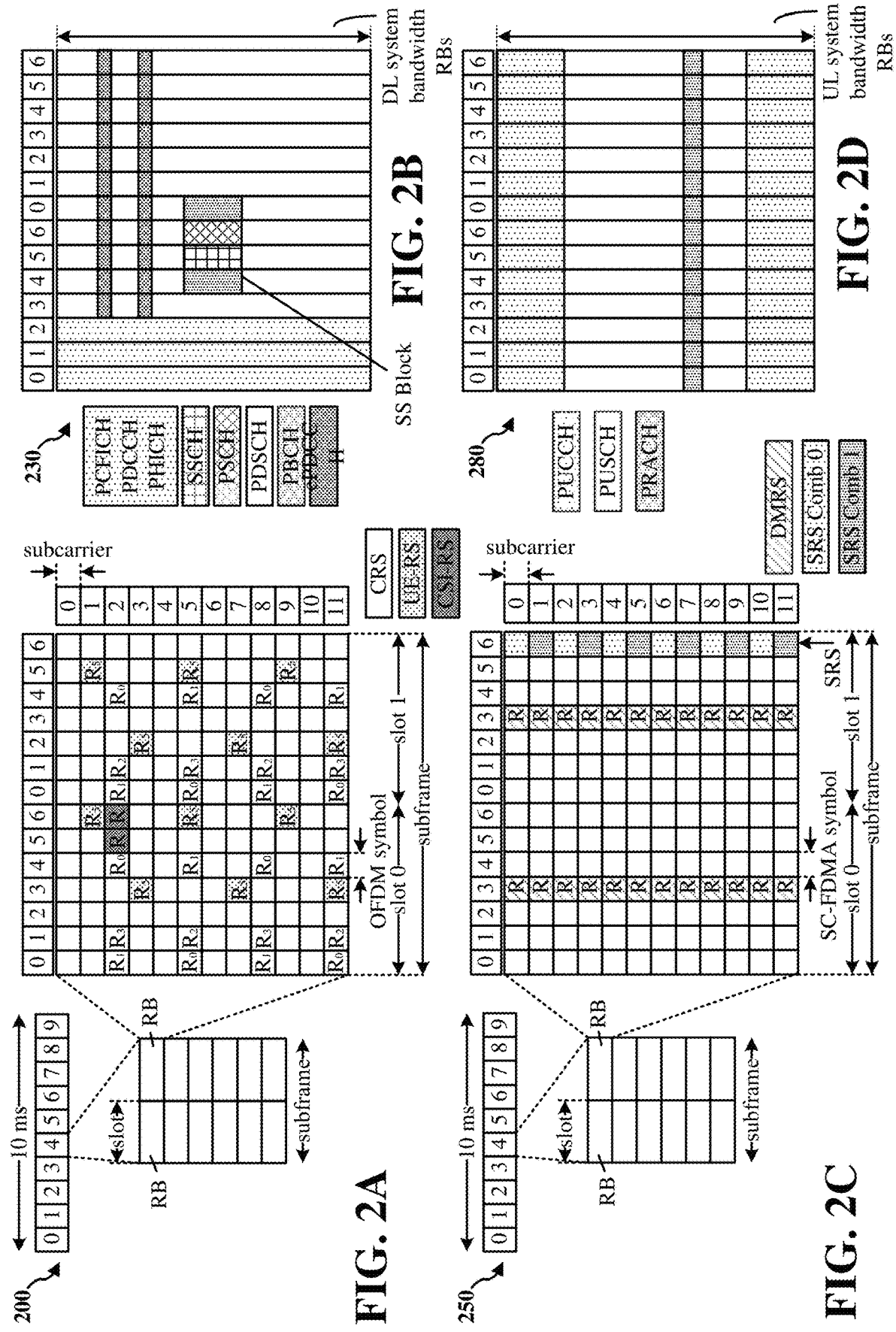
FIGS. 2A, 2B, 2C, and 2D are diagrams illustrating examples of a DL frame structure, DL channels within the DL frame structure, an UL frame structure, and UL channels within the UL frame structure, respectively.

FIG. 2A is a diagram 200 illustrating an example of a DL frame structure. FIG. 2B is a diagram 230 illustrating an example of channels within the DL frame structure. FIG. 2C is a diagram 250 illustrating an example of an UL frame structure. FIG. 2D is a diagram 280 illustrating an example of channels within the UL frame structure. Other wireless communication technologies may have a different frame structure and/or different channels. A frame (10 ms) may be divided into 10 equally sized subframes. Each subframe may include two consecutive time slots. A resource grid may be used to represent the two time slots, each time slot including one or more time concurrent RBs (also referred to as physical RBs (PRBs)). The resource grid is divided into multiple resource elements (REs). For a normal cyclic prefix, an RB may contain 12 consecutive subcarriers in the frequency domain and 7 consecutive symbols (for DL, OFDM symbols; for UL, SC-FDMA symbols) in the time domain, for a total of 84 REs. For an extended cyclic prefix, an RB may contain 12 consecutive subcarriers in the frequency domain and 6 consecutive symbols in the time domain, for a total of 72 REs. The number of bits carried by each RE depends on the modulation scheme. As illustrated in FIG. 2A, some of the REs carry DL reference (pilot) signals (DL-RS) for channel estimation at the UE. The DL-RS may include cell-specific reference signals (CRS) (also sometimes called common RS), UE-specific reference signals (UE-RS), and channel state information reference signals (CSI-RS). FIG. 2A illustrates CRS for antenna ports 0, 1, 2, and 3 (indicated as $R_0$, $R_1$, $R_2$, and $R_3$, respectively), UE-RS for antenna port 5 (indicated as $R_5$), and CSI-RS for antenna port 15 (indicated as R).

FIG. 2B illustrates an example of various channels within a DL subframe of a frame. The physical control format indicator channel (PCFICH) is within symbol 0 of slot 0, and carries a control format indicator (CFI) that indicates whether the physical downlink control channel (PDCCH) occupies 1, 2, or 3 symbols (FIG. 2B illustrates a PDCCH that occupies 3 symbols). The PDCCH carries downlink control information (DCI) within one or more control channel elements (CCEs), each CCE including nine RE groups (REGs), each REG including four consecutive REs in an OFDM symbol. A UE may be configured with a UE-specific enhanced PDCCH (ePDCCH) that also carries DCI. The ePDCCH may have 2, 4, or 8 RB pairs (FIG. 2B shows two RB pairs, each subset including one RB pair). The physical hybrid automatic repeat request (ARQ) (HARQ) indicator channel (PHICH) is also within symbol 0 of slot 0 and carries the HARQ indicator (HI) that indicates HARQ ACK/NACK feedback based on the PUSCH. The primary synchronization channel (PSCH) may be within symbol 6 of slot 0 within subframes 0 and 5 of a frame. The PSCH carries a primary synchronization signal (PSS) that is used by a UE 104 to determine subframe/symbol timing and a physical layer identity. The secondary synchronization channel (SSCH) may be within symbol 5 of slot 0 within subframes 0 and 5 of a frame. The SSCH carries a secondary synchronization signal (SSS) that is used by a UE to determine a physical layer cell identity group number and radio frame timing. Based on the physical layer identity and the physical layer cell identity group number, the UE can determine a physical cell identifier (PCI). Based on the PCI, the UE can determine the locations of the aforementioned DL-RS. The physical broadcast channel (PBCH), which carries a master information block (MIB), may be logically grouped with the PSCH and SSCH to form a synchronization signal (SS) block. The MIB provides a number of RBs in the DL system bandwidth, a PHICH configuration, and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DMRS for channel estimation at the base station. The UE may additionally transmit sounding reference signals (SRS) in the last symbol of a subframe. The SRS may have a comb structure, and a UE may transmit SRS on one of the combs. The SRS may be used by a base station for channel quality estimation to enable frequency-dependent scheduling on the UL.

FIG. 2D illustrates an example of various channels within an UL subframe of a frame. A physical random access channel (PRACH) may be within one or more subframes within a frame based on the PRACH configuration. The PRACH may include six consecutive RB pairs within a subframe. The PRACH allows the UE to perform initial system access and achieve UL synchronization. A physical uplink control channel (PUCCH) may be located on edges of the UL system bandwidth. The PUCCH carries UCI, such as scheduling requests, a CQI, a precoding matrix indicator (PMI), an RI, and HARQ ACK/NACK feedback. The PUSCH carries data, and may additionally be used to carry a buffer status report (BSR), a power headroom report (PHR), and/or UCI.

Figure 3:
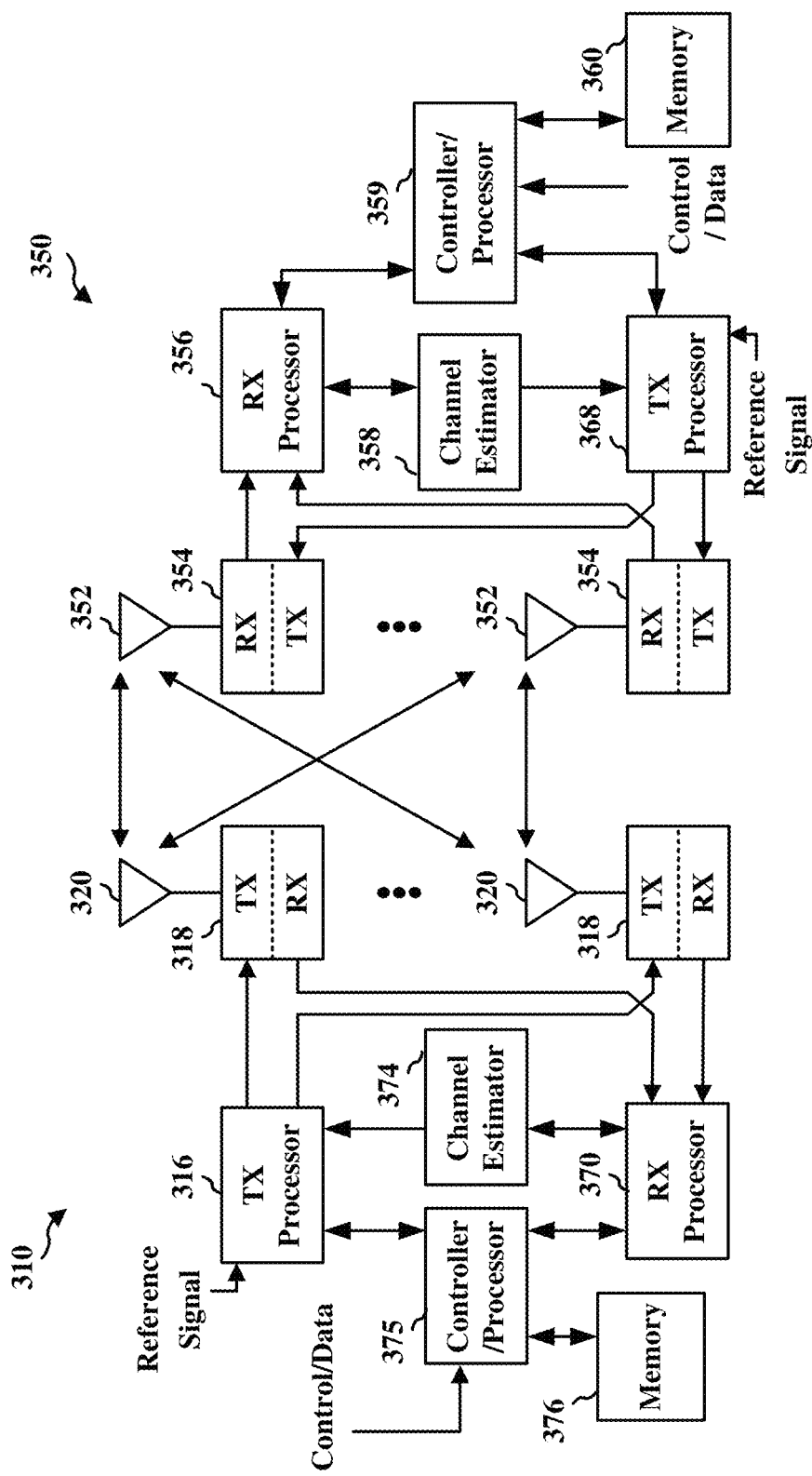
FIG. 3 is a diagram illustrating an example of a base station and user equipment (UE) in an access network.

FIG. 3 is a block diagram of a base station 310 in communication with a UE 350 in an access network. In the DL, IP packets from the EPC 160 may be provided to a controller/processor 375. The controller/processor 375 implements layer 3 and layer 2 functionality. Layer 3 includes a radio resource control (RRC) layer, and layer 2 includes a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318TX. Each transmitter 318TX may modulate an RF carrier with a respective spatial stream for transmission.

At the UE 350, each receiver 354RX receives a signal through its respective antenna 352. Each receiver 354RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the base station 310 in a manner similar to that described in connection with the receiver function at the UE 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK and/or NACK protocol to support HARQ operations.

The UE 350 may be configured to map the DMRS sequence to a first symbol in a set of resource blocks (RBs) of an uplink long burst, and the first symbol may occur at the beginning of the uplink long burst. In other words, the DMRS sequence may be "front-loaded" in the uplink long burst. Accordingly, the DMRS sequence may be dependent upon RB locations, e.g., as opposed to dependent upon length (i.e., number of RBs).

The location-dependent DMRS sequence may allow a base station to quickly identify the DMRS sequence—e.g., when the base station 310 knows the RB index of the beginning of the DMRS sequence, the base station 310 may quickly identify the DMRS sequence. Therefore, the base station 310 may perform interference estimation and cancellation more quickly, for example, then if a length-dependent DMRS sequence were used. Additionally, mapping the DMRS sequence to the first symbol in a set of RBs of the uplink long burst may reduce turnaround (e.g., between uplink and downlink subframes) experienced by the base station 310.

While the DMRS sequence may be mapped to the beginning of a uplink long burst, UCI may be mapped in a PUSCH. For example, a UE may map UCI in a PUSCH after the DMRS sequence is mapped to the beginning of the uplink long burst. When the base station receives an uplink long burst including the front-loaded DMRS and the UCI mapped in the PUSCH, the base station may quickly identify the DMRS for channel estimation/interference cancelation of the UCI carried on the PUSCH.

Figure 4:
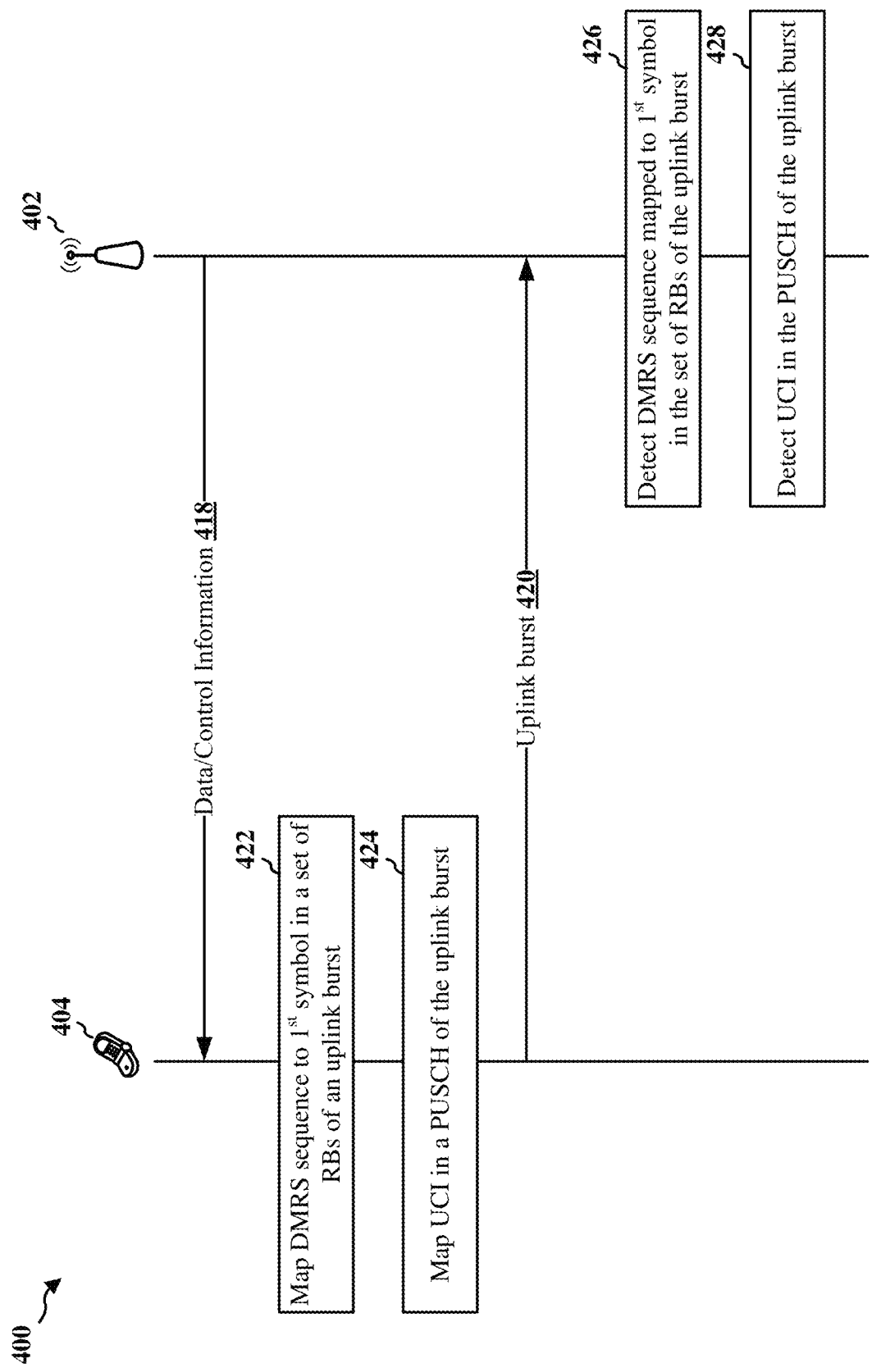
FIG. 4 is a call flow diagram of a wireless communications system.
Figure 5:
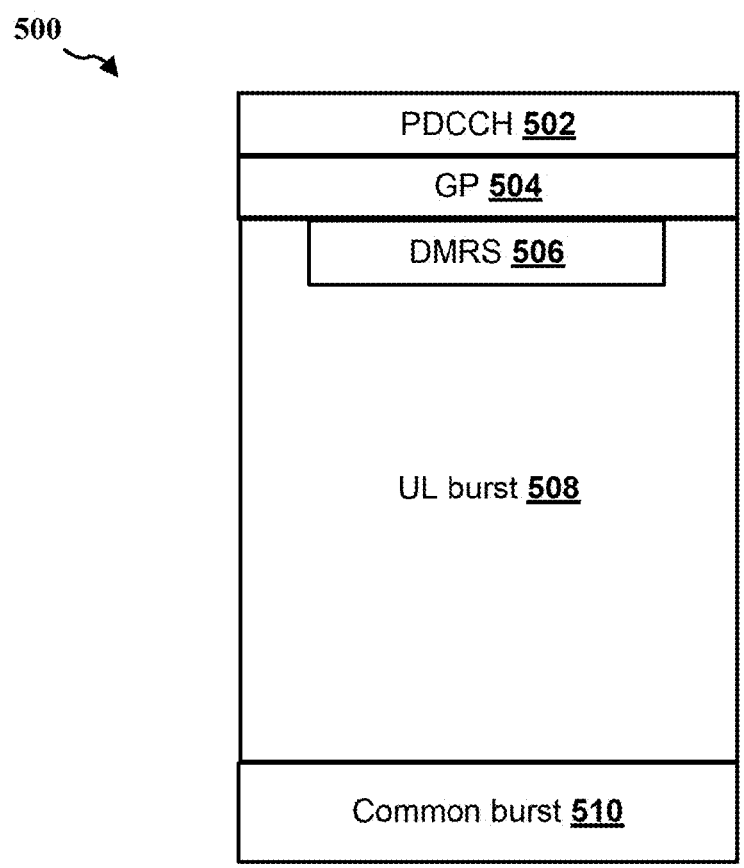
FIG. 5 is a diagram of an uplink-centric signal.

In the context of FIGS. 4-11, various aspects of mapping a DMRS to a beginning of an uplink burst and mapping UCI in a PUSCH are illustrated. For example, FIG. 4 illustrates a call flow diagram between a UE and a base station. The UE may map a DMRS to the beginning of an uplink burst and may map UCI in a PUSCH of the uplink burst. FIG. 5 illustrates an uplink-centric signal, for example, that may include a front-loaded DMRS and a burst to carry UCI mapped in a PUSCH. FIGS. 6-11 illustrate various uplink burst structures in which a DMRS is mapped and UCI is mapped in a PUSCH.

FIG. 4 is a call flow diagram illustrating a method 400 of wireless communication by a base station 402 and a UE 404. In various aspects, the base station 402 may send, to the UE 404, at least one of downlink data or control information 418. Based on the downlink data and/or control information 418, the UE 404 may be scheduled to send at least one uplink burst (e.g., an uplink long burst) to the base station 402.

In various aspects, the UE 404 may be configured to send, in the uplink burst 420, a DMRS sequence to the base station 402. The DMRS sequence may be used for channel estimation, for example, in association with demodulation of a PUSCH. In an aspect, the DRMS sequence may be a Zadoff-Chu (ZC) sequence or may be a segment of a ZC sequence.

The UE 404 may be configured to map 422 a DMRS sequence to a first symbol in a set of RBs of an uplink burst 420, and the first symbol may occur at the beginning of the uplink burst 420. For example, the DMRS sequence may be "front-loaded" in the uplink burst 420—that is, the DRMS sequence may appear in at least the first symbol of the uplink burst. Accordingly, the DMRS sequence may be dependent upon RB locations, e.g., as opposed to dependent upon length (i.e., number of RBs). This mapping of the DMRS sequence may be used in ODFMA and SC-FDMA systems.

The location-dependent DMRS sequence may allow the base station 402 to quickly identify the DMRS sequence— e.g., when the base station 402 knows the RB index of the beginning of the DMRS sequence, the base station 402 may quickly identify the DMRS sequence. Therefore, the base station 402 may perform interference estimation and cancellation more quickly, for example, then if a length-dependent DMRS sequence were used. Additionally, mapping 422 the DMRS sequence to the first symbol in a set of RBs of the uplink burst 420 may reduce turnaround (e.g., switching between uplink and downlink subframes) experienced by the base station 402.

Based on the downlink data or control information 418, the UE 404 may determine UCI. For example, the UE 404 may determine at least one of a CQI, ACK/NACK feedback, and/or an RI.

In aspects, the UE 404 may determine the CQI based on measuring a value associated with channel quality on which the data and/or control information 418 is received. For example, the UE 404 may measure at least one of a signal-to-noise ratio (SNR), a signal-to-noise-plus-interference ratio (SNIR), a signal-to-noise-plus-distortion ratio (SNDR). Based on the measured at least one of the SNR, SNIR, and/or SNDR, the UE 404 may determine a value representative of channel quality. For example, the UE 404 may select a value between one and thirty to represent the CQI, as in LTE.

Similar to CQI, the UE 404 may determine the RI based on measuring a value indicative of channel quality on which the data and/or control information 418 is received. For example, the UE 404 may measure an SNR. Based on the measured SNR, the UE 404 may select or identify an RI in order to indicate a number of layers and the number of different signal streams to be utilized by the base station 402 (e.g., integer values to indicate single-input-multiple-output (SIMO) or MIMO).

In aspects, the UE 404 may determine the ACK/NACK feedback. For example, the UE 404 may determine whether at least a portion of the data and/or control information 418 is successfully received. If the at least the portion of the data and/or control information 418 is successfully received, then the UE 404 may determine the ACK/NACK feedback to include an ACK. If the at least the portion of the data and/or control information 418 is unsuccessfully received (e.g., due to error, cyclic redundancy check failure, etc.), then the UE 404 may determine the ACK/NACK feedback as a NACK.

In a first aspect, the UE 404 may first map the PUSCH in the uplink burst 420. In other words, the UE 404 may assign the PUSCH to one or RBs so that at least a portion of uplink data and/or control information to be carried on the PUSCH is conveyed on the one or more RBs. The UE 404 may map the PUSCH frequency first—e.g., the UE 404 may map the PUSCH on a frequency-basis, such as subcarrier by subcarrier across symbols. A frequency-basis may include or may be a subcarrier-basis (e.g., such as subcarrier by subcarrier across symbols). The UE 404 may also map the PUSCH time first—e.g., the UE 404 may map the PUSCH on a time-basis, such as symbol by symbol across subcarriers. In an aspect, a time-basis may include or may be a symbol-basis (e.g., symbol by symbol across subcarriers).

The UE 404 may map 424 the CQI to the beginning of the PUSCH, and the remaining PUSCH data may be rate matched around the CQI—for example, the UE 404 may rate match the PUSCH data around the CQI by adapting the code rate of data in the PUSCH, e.g., so that the number of data/control information (and potentially parity) bits matches the allocation associated with the CQI. For example, the UE 404 may map 424 control data (e.g., CQI, ACK/NACK feedback, and/or RI) to the beginning of the PUSCH, and then other PUSCH data (e.g., user data) may be rate-matched around the mapped control data (e.g., CQI) in the PUSCH. In an aspect, the UE 404 may map 424 the CQI time first—e.g., the UE 404 may map the CQI on a time-basis (e.g., symbol-basis), such as symbol by symbol across subcarriers. In another aspect, the UE 404 may map 424 the CQI frequency first—e.g., the UE 404 may map 424 the CQI on a frequency-basis, such as subcarrier by subcarrier across symbols. In an aspect, the subcarriers for CQI may be non-contiguous in frequency. Mapping 424 the CQI frequency first may increase performance of the CQI relative to time-first mapping, but may impede the PUSCH timeline. Mapping 424 the CQI frequency first may also allow the base station to decode some high priority UCI, e.g., beam information early.

In a second aspect, the CQI may be mapped to an end of the PUSCH, and the PUSCH may be rate matched around the CQI. For example, the UE 404 may map 424 control data (e.g., CQI, ACK/NACK feedback, and/or RI) to the end of the PUSCH, and other PUSCH data (e.g., user data) may be rate-matched around the mapped control data (e.g., CQI) in the PUSCH. The UE 404 may map 424 the CQI frequency first—e.g., the UE 404 may map 424 the CQI on a frequency-basis, such as subcarrier by subcarrier across symbols. In an aspect, the subcarriers for CQI may be non-contiguous in frequency. The frequency-first mapping of the CQI to the end of the PUSCH may increase performance and timeline of the PUSCH (e.g., relative to the aforementioned first aspect), but may reduce performance of the CQI. Further, frequency-first mapping of the CQI to the end of the PUSCH may delay the decoding of CQI and therefore may be feasible if time-sensitive or high-priority CQI, e.g., beam information, is not present.

In an aspect, the UE 404 may map 424 the ACK/NACK feedback to a second symbol in a second set of RBs next to the first set of RBs to which the DMRS sequence is mapped. The UE 404 may map the ACK/NACK feedback frequency first. In an aspect, the subcarriers for ACK/NACK feedback may be non-contiguous in frequency. The UE 404 may puncture the PUSCH with the ACK/NACK feedback—e.g., at least a portion of a set of RBs corresponding to the PUSCH may be used to carry bits conveying the ACK/NACK feedback. For example, the UE 404 may map user data to the PUSCH, and then the UE 404 may puncture the user data by mapping 424 the ACK/NACK feedback over the user data in the PUSCH. Further, the UE 404 may map 424 the RI to a third symbol in a third set of RBs next to the second set of RBs to which the ACK/NACK feedback is mapped. The UE 404 may puncture the PUSCH data with the RI—e.g., at least a portion of a set of RBs corresponding to the PUSCH may be used to carry bits conveying the RI. Such an aspect may increase ACK/NACK feedback and RI performance (e.g., relative to LTE mapping of ACK/NACK feedback and RI), but may reduce performance and timeline of the PUSCH data because one or more of the first code blocks of the PUSCH data may be heavily punctured by the ACK/NACK feedback and RI. In another aspect, the PUSCH data may be rate matched around at least one of the ACK/NACK feedback or RI.

In another aspect, the UE 404 may map 424 the ACK/NACK feedback and RI frequency first (e.g., symbol by symbol across subcarriers), for example, beginning with a next symbol immediately following a last symbol to which the CQI is mapped. In an aspect, the subcarriers for ACK/NACK feedback or RI may be non-contiguous in frequency. The UE 404 may puncture the PUSCH data with at least one of the ACK/NACK feedback and RI. Alternatively, the UE 404 may rate match the PUSCH data around at least one of the ACK/NACK feedback and RI. In another aspect, the UE 404 may map 424 at least one of the ACK/NACK feedback and the RI from the beginning of the PUSCH (e.g., puncturing the PUSCH) before CQI.

In various aspects, the UE 404 may apply a discrete Fourier transform (DFT) to at least each symbol in the uplink burst 420 to which the UCI is mapped 424. By applying the DFT to the symbols, the UE 404 may maintain the SC-FDM waveform. For example, the UE 404 may use the uplink burst 700 having the SC-FDMA waveform in LTE and/or 5G NR systems. In another aspect, the UE 404 may refrain from applying the DFT to symbols, e.g., for cyclic prefix (CP) OFDM waveform.

The base station 402 may receive the uplink burst 420 from the UE 404. The base station 402 may detect 426 the DMRS sequence in the uplink burst 420. Because the DMRS sequence is location-dependent, the base station 402 may quickly detect 426 the DMRS sequence in the beginning of the uplink burst 420. The base station 402 may use the DMRS sequence for channel estimation and/or interference cancellation.

After detecting the DMRS sequence, the base station 402 may detect 428 the UCI mapped in a PUSCH of the uplink burst 420. In various aspects, the base station 402 may detect 428 the UCI based on the DMRS sequence. For example, the base station 402 may use the DMRS sequence for interference cancelation on the PUSCH in which the UCI is mapped. By detecting 428 the UCI, the base station 402 may identify at least one of a CQI, ACK/NACK feedback, and/or an RI associated with the UE 404. Accordingly, the base station 402 may select a data rate, determine downlink data, select a transmission mode, etc. for the UE 404 based on the UCI. For example, the base station 402 may use the CQI to select a suitable modulation-and-coding scheme (MCS). The base station 402 may use the RI in association with MIMO—e.g., the base station 402 may determine, based on the RI, the number of layers to be used with the UE 404 (e.g., the number of different data streams to be contemporaneously transmitted on the same resources).

FIG. 5 is a block diagram 500 of an uplink-centric signal. In an aspect, a PDCCH 502 may be received, e.g., by the UE 404. The PDCCH 502 may be followed by a guard period (GP) 504, for example, to allow the UE 404 to switch from reception to transmission.

The GP 504 may be followed by an uplink (UL) burst 508 (e.g., an aspect of the uplink burst 420 of FIG. 4). The UL burst 508 may be an UL long burst (e.g., UL long burst). The UL burst 508 may be sent by the UE 404 to the base station 402, e.g., as at least a portion of a subframe. The UE 404 may include, in the UL burst 508, control and/or payload data from the UE 404. The UL burst 508 may include a DMRS sequence 506. The DMRS 506 may be front-loaded—that is, the UE 404 may map the DMRS sequence 506 to at least a first symbol of a set of RBs corresponding to the UL burst 508 (e.g., in the uplink burst 420). The front-loaded DMRS sequence 506 may facilitate a faster turnaround (e.g., between subframes and/or for transmission/reception).

In an aspect, the DMRS sequence 506 may be based on RB locations (e.g., based on RBs corresponding to the UL burst 508), for example, instead of based on a number of RBs. Accordingly, once an RB index is known, the DMRS sequence 506 may be known. This approach may facilitate better interference information and/or cancellation, for example, when downlink and uplink interference occurs between neighbor cells with different uplink and/or downlink configurations. In one aspect, the uplink DMRS sequence 506 may be symmetrical to a downlink DMRS sequence, which may also be front-loaded in a downlink burst.

The UL burst 508 may be followed by a common burst 510 (e.g., UL common burst 510). The common burst 510 may include control and/or payload data. In one aspect, the UE 404 may include, in the common burst 510, UCI. For example, the common burst 510 may include ACK/NACK feedback.

Figure 6:
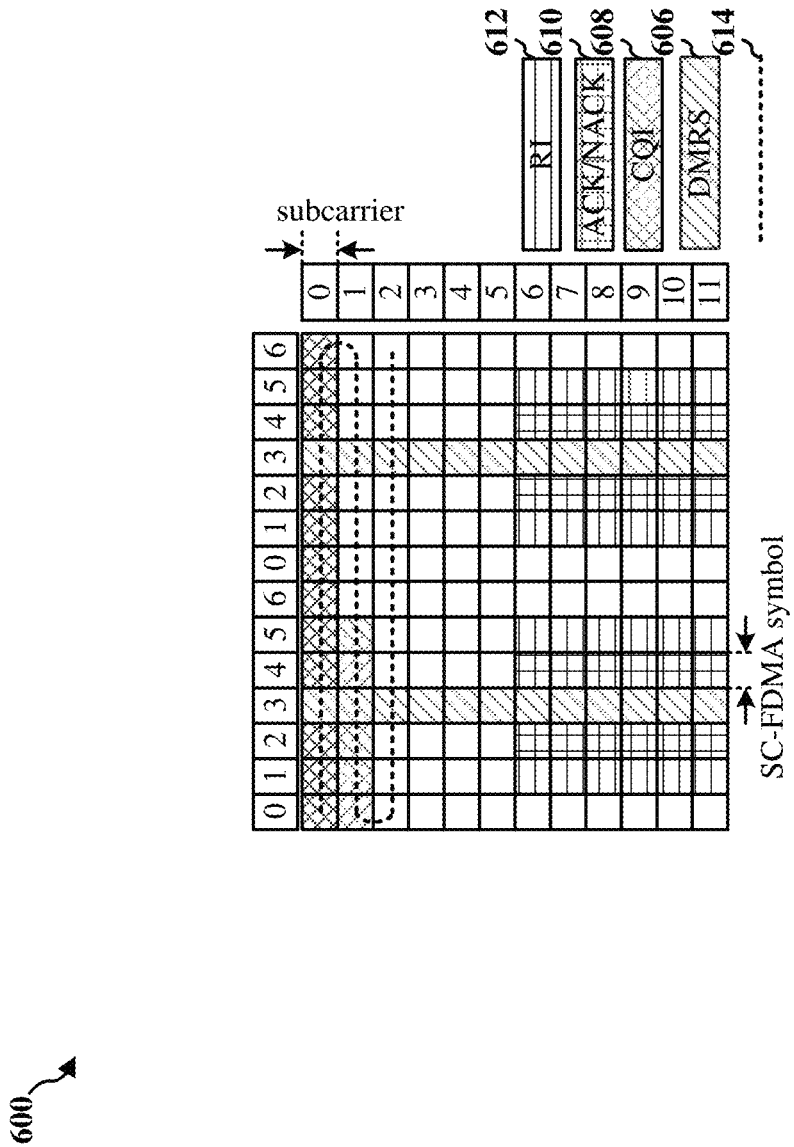
FIG. 6 is a diagram of an uplink burst.

FIG. 6 illustrates a uplink burst 600 for sending UCI, which may include at least one of a CQI 608, ACK/NACK feedback 610, and/or an RI 612. The uplink burst 600 may be used, for example, in LTE systems. In an aspect, the uplink burst 600 may be an aspect of the uplink burst 420 illustrated in FIG. 4.

In the illustrated aspect, the DMRS sequence 606 may be carried on a center symbol of a slot (e.g., symbol three and symbol ten of the uplink burst 600). This mapping of the DMRS sequence 606 may be used in LTE systems.

In the context of FIG. 4, the UE 404 may map 424 the UCI, including the at least one of the CQI 608, ACK/NACK feedback 610, and/or RI 612, in a PUSCH 614 of the uplink burst 700. The UE 404 may map 424 the CQI 608 time first in the uplink burst 700—i.e., the UE 404 may map 424 the CQI 608 symbol by symbol across subcarriers. The UE 404 may rate-match data to be carried on the PUSCH 614 (e.g., user data) around the mapped UCI (e.g., at least one of the CQI 608, ACK/NACK feedback 610, and/or RI 612).

In one aspect, the UE 404 may map 424 the ACK/NACK feedback 610 to a second symbol in a second set of RBs next to the first set of RBs to which the DMRS sequence 606 is mapped. The UE 404 may puncture the PUSCH 614 with the ACK/NACK feedback 610. For example, the UE 404 may map data (e.g., user data) to the PUSCH 614 and then puncture the ACK/NACK feedback 610 in the data of the PUSCH 614. Alternatively, the UE 404 may rate match the PUSCH 614 around the ACK/NACK feedback 610. For example, the UE 404 may map the ACK/NACK feedback 610 and then rate-match other data (e.g., user data) to be carried on the PUSCH 614 around the mapped ACK/NACK feedback 610.

In an aspect, the UE 404 may map 424 the RI 612 to a third symbol in a third set of RBs next to the second set of RBs to which the ACK/NACK feedback 610 is mapped. The UE 404 may puncture the PUSCH 614 with the RI 612. Alternatively, the UE 404 may rate match the PUSCH 614 around the RI 612.

In various aspects, the UE 404 may apply a DFT to at least each symbol in the uplink burst 700 to which the UCI is mapped 424. By applying the DFT to the symbols, the UE 404 may maintain the SC-FDM waveform. In another aspect, the UE 404 may refrain from applying a DFT, e.g., for CP-ODFM waveforms.

Turning to FIGS. 7-11, UCI may be modified, for example, relative to the aspects presented with respect to FIG. 6). In various aspects, UCI may be carried on a PUSCH. The modified UCI over the PUSCH may be used for an SC-FDMA waveform.

Figure 7:
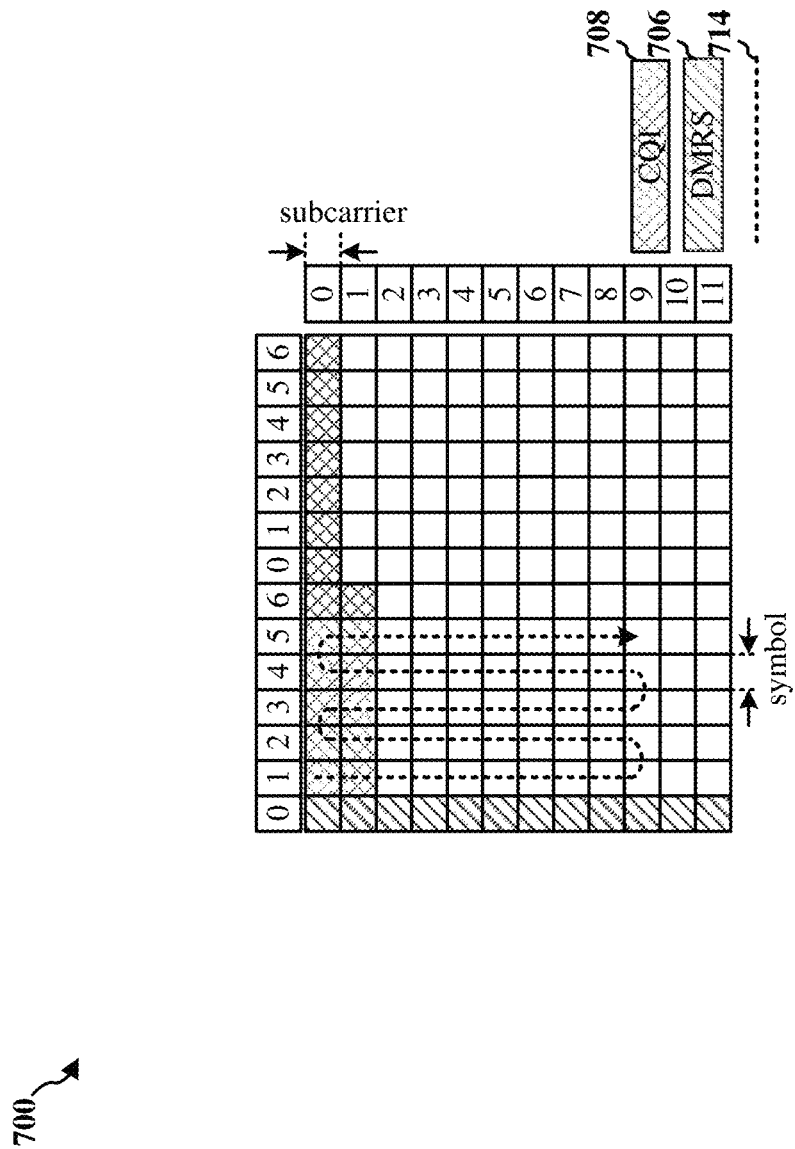
FIG. 7 is a diagram of an uplink burst.

FIG. 7 illustrates a uplink burst 700 for sending UCI, which may include at least a CQI 708. The uplink burst 700 may be used, for example, in LTE systems and/or in 5G NR systems. For example, the uplink burst 700 may be at least a portion of at least one subframe. In an aspect, the uplink burst 700 may be an aspect of the uplink burst 420 illustrated in FIG. 4.

In the illustrated aspect, the DMRS sequence 706 may be carried on a first symbol of a slot (e.g., symbol zero of the uplink burst 700). In the context of FIG. 4, the UE 404 may map 422 the DMRS sequence 706 to a first symbol (e.g., symbol zero) of a set of RBs (e.g., subcarriers zero through eleven during symbol zero) that occurs at the beginning of the uplink burst 700.

The UE 404 may map the PUSCH 714 in the uplink burst 700. In an aspect, the UE 404 may map the PUSCH 714 frequency first. That is, the UE 404 may map the PUSCH 714 on a frequency-basis (e.g., subcarrier-basis), such as subcarrier by subcarrier across symbols. For example, the UE 404 may map the PUSCH 714 beginning in the first symbol (e.g., symbol one) in the uplink burst 700 and the first subcarrier (e.g., subcarrier zero) of the set of RBs to which the PUSCH 714 is to be mapped. Continuing with symbol one, the UE 404 may then map the PUSCH 714 to the next subcarrier (e.g., subcarrier one), and so forth until the UE 404 reaches the last subcarrier (e.g., subcarrier nine) to which the PUSCH 714 is to be mapped. The UE 404 may then advance to the second symbol (e.g., symbol two) at the same subcarrier (e.g., subcarrier nine) in the uplink burst 700 to continue mapping the PUSCH 714. When the UE 404 reaches the final subcarrier (e.g., subcarrier zero) to which the PUSCH 714 is to be mapped during the second symbol (e.g., symbol two), the UE 404 may then wrap around to continue at the third symbol (e.g., symbol three) on the same subcarrier at which the mapping ended during the second symbol (e.g., subcarrier zero). The UE 404 may continue this subcarrier by subcarrier mapping across symbols until the PUSCH 714 is entirely mapped.

In one aspect, the UE 404 may map the PUSCH 714 beginning with the symbol (e.g., symbol one) in a set of RBs immediately following the first symbol (e.g., symbol zero) to which the DMRS sequence 706 is mapped.

The UE 404 may map 424 the UCI, including the CQI 708, in a PUSCH 714 of the uplink burst 700. In various aspects, the UE 404 may map 424 the CQI 708 to the beginning of the PUSCH 714—e.g., the UE 404 may map the CQI 708 beginning at a first RB (e.g., symbol one× subcarrier zero) of the PUSCH 714, which may also be the first RB following the front-loaded DMRS sequence 706.

The UE 404 may map 424 the CQI 708 time first in the uplink burst 700—i.e., the UE 404 may map 424 the CQI 708 symbol by symbol across subcarriers. For example, the UE 404 may map 424 the CQI 708 beginning in the first symbol (e.g., symbol one) and the first subcarrier (e.g., subcarrier zero) of the set of RBs following the set of RBs to which the DMRS sequence 706 is mapped. Continuing with the first subcarrier (e.g., subcarrier zero), the UE 404 may then map the CQI 708 to the next symbol (e.g., symbol two), and so forth until the UE 404 reaches the last symbol (e.g., symbol six of the second slot, also referred to as symbol thirteen or the fourteenth symbol of the uplink burst 700) to which the CQI 708 is to be mapped. The UE 404 may then advance to the second subcarrier (e.g., subcarrier one) and return to the first symbol (e.g., symbol one) to continue mapping the CQI 708 symbol by symbol until either the end of the CQI 708 or the last symbol is reached on the second subcarrier (e.g., subcarrier one).

The UE 404 may rate-match the PUSCH 714 around the mapped CQI 708. For example, the UE 404 may map the CQI 708 and then rate-match user data to be carried on the PUSCH 714 around the CQI 708. In various aspects, one or more of the ACK/NACK feedback and/or the RI may be absent from the UCI mapped in the PUSCH 714.

Figure 8:
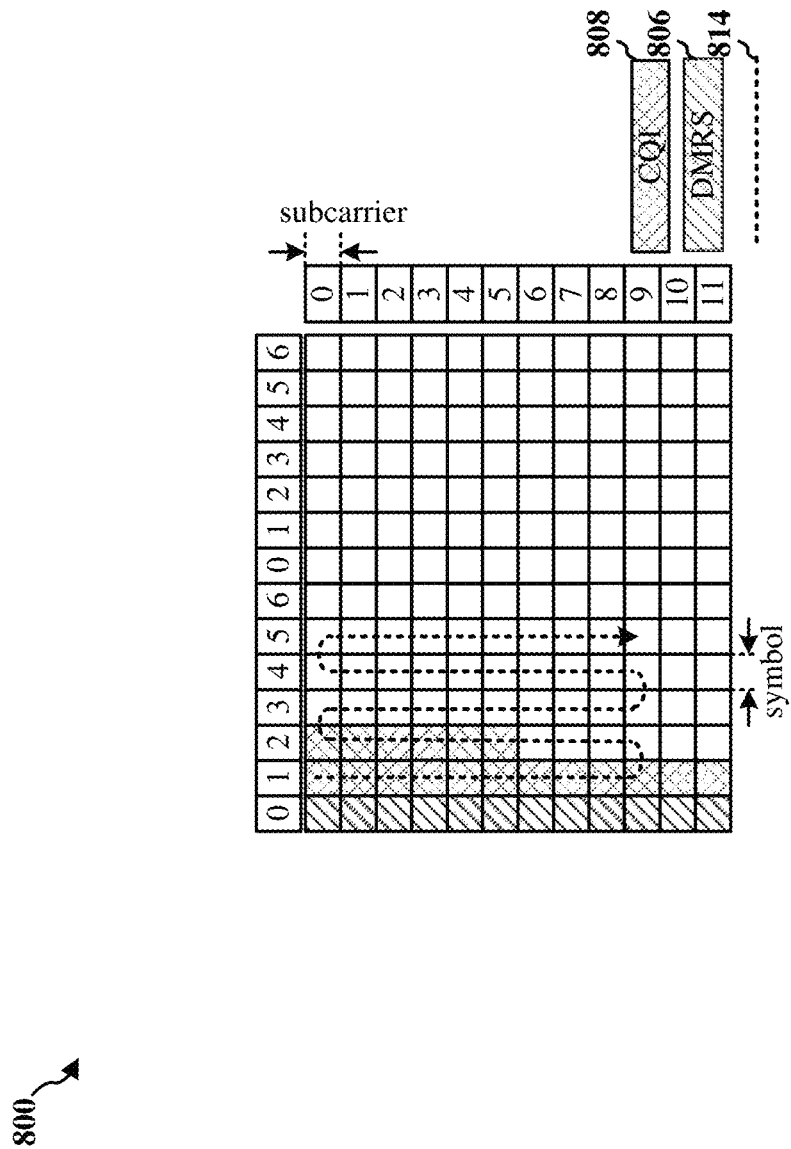
FIG. 8 is a diagram of an uplink burst.

FIG. 8 illustrates a uplink burst 800 for sending UCI, which may include at least a CQI 808. The uplink burst 800 may be used, for example, in LTE systems and/or in 5G NR systems. For example, the uplink burst 800 may be at least a portion of at least one subframe. In an aspect, the uplink burst 800 may be an aspect of the uplink burst 420 illustrated in FIG. 4.

In the illustrated aspect, the DMRS sequence 806 may be carried on a first symbol of a slot (e.g., symbol zero of the uplink burst 800). In the context of FIG. 4, the UE 404 may map 422 the DMRS sequence 806 to a first symbol (e.g., symbol zero) of a set of RBs (e.g., subcarriers zero through eleven during symbol zero) that occurs at the beginning of the uplink burst 800.

The UE 404 may map the PUSCH 814 in the uplink burst 800. In an aspect, the UE 404 may map the PUSCH 814 frequency first. That is, the UE 404 may map the PUSCH 814 on a frequency-basis (e.g., subcarrier-basis), such as subcarrier by subcarrier across symbols. In one aspect, the UE 404 may map the PUSCH 814 beginning with the symbol (e.g., symbol one) in a set of RBs immediately following the first symbol (e.g., symbol zero) to which the DMRS sequence 806 is mapped.

The UE 404 may map 424 the UCI, including the CQI 808, in a PUSCH 814 of the uplink burst 800. In various aspects, the UE 404 may map 424 the CQI 808 to the beginning of the PUSCH 814—e.g., the UE 404 may map the CQI 808 beginning at a first RB (e.g., symbol one× subcarrier zero) of the PUSCH 814, which may also be the first RB following the front-loaded DMRS sequence 806.

The UE 404 may map 424 the CQI 808 frequency first in the uplink burst 800—i.e., the UE 404 may map 424 the CQI 808 on a frequency-basis (e.g., subcarrier-basis), such as subcarrier by subcarrier across symbols. For example, the UE 404 may map 424 the CQI 808 beginning on the first subcarrier (e.g., subcarrier zero) and during the first symbol (e.g., symbol one) of the set of RBs following the set of RBs to which the DMRS sequence 806 is mapped. Continuing with the first symbol (e.g., symbol one), the UE 404 may then map the CQI 808 to the next subcarrier (e.g., subcarrier one), and so forth until the UE 404 reaches the last subcarrier (e.g., subcarrier eleven) to which the CQI 808 is to be mapped. The UE 404 may then advance to the second symbol (e.g., symbol two) and return to the first subcarrier (e.g., subcarrier zero) to continue mapping the CQI 808 subcarrier by subcarrier until either the end of the CQI 808 or the last subcarrier is reached on the second symbol. In an aspect, the subcarriers for ACK/NACK feedback may be non-contiguous in frequency. For example, the UE 404 may map 424 the CQI 808 to even subcarriers. The UE 404 may map 424 the CQI 808 beginning on the first subcarrier (e.g., subcarrier zero) and during the first symbol (e.g., symbol one) of the set of RBs following the set of RBs to which the DMRS sequence 806 is mapped. Continuing with the first symbol (e.g., symbol one), the UE 404 may then map the CQI 808 to the next CQI subcarrier (e.g., subcarrier two), and so forth until the UE 404 reaches the last CQI subcarrier (e.g., subcarrier ten) to which the CQI 808 is to be mapped. The UE 404 may then advance to the second symbol (e.g., symbol two) and return to the first subcarrier (e.g., subcarrier zero) to continue mapping the CQI 808 subcarrier by subcarrier until either the end of the CQI 808 or the last CQI subcarrier is reached on the second symbol (e.g., symbol one).

The UE 404 may rate-match the PUSCH 814 around the mapped CQI 808. For example, the UE 404 may map the CQI 808, and then the UE 404 may map data (e.g., user data) to the PUSCH 814, and the UE 404 may rate-match the data in the PUSCH 814 around the CQI 808. In various aspects, one or more of the ACK/NACK feedback and/or the RI may be absent from the UCI mapped in the PUSCH 814.

Figure 9:
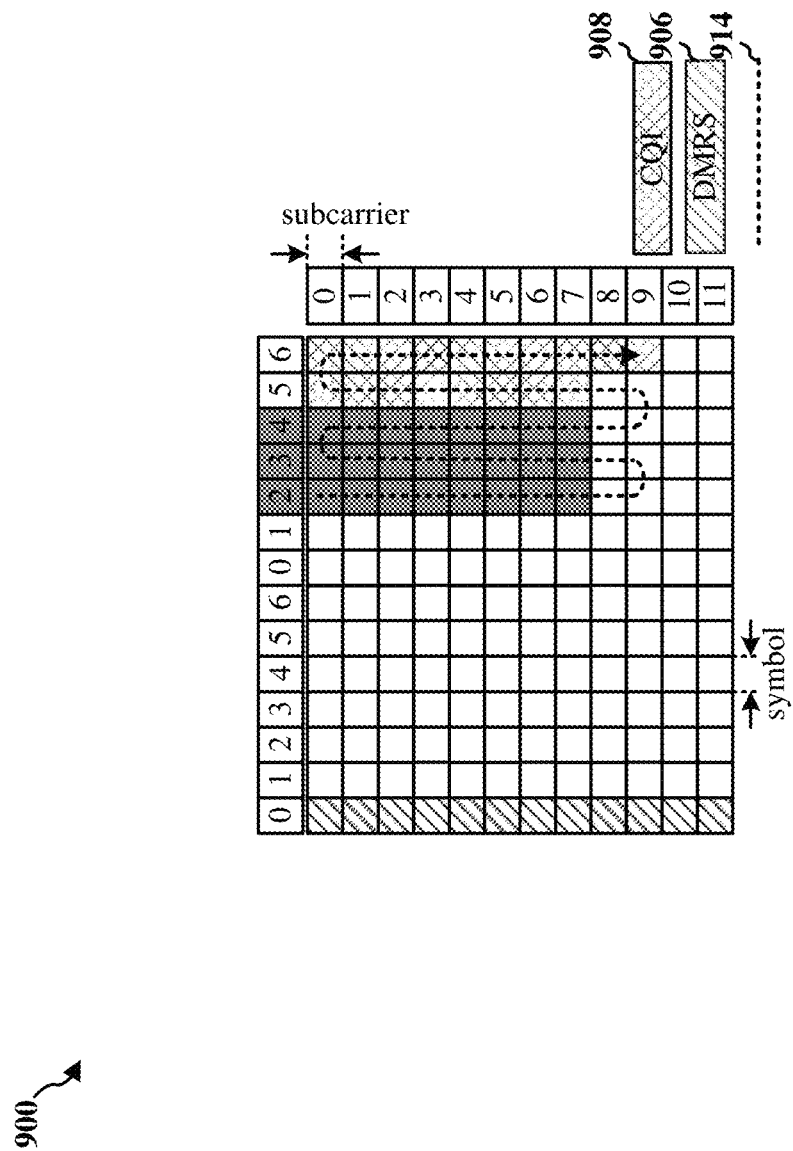
FIG. 9 is a diagram of an uplink burst.

FIG. 9 illustrates a uplink burst 900 for sending UCI, which may include at least a CQI 908. The uplink burst 900 may be used, for example, in LTE systems and/or in 5G NR systems. For example, the uplink burst 900 may be at least a portion of at least one subframe. In an aspect, the uplink burst 900 may be an aspect of the uplink burst 420 illustrated in FIG. 4.

In the illustrated aspect, the DMRS sequence 906 may be carried on a first symbol of a slot (e.g., symbol zero of the uplink burst 900). In the context of FIG. 4, the UE 404 may map 422 the DMRS sequence 906 to a first symbol (e.g., symbol zero) of a set of RBs (e.g., subcarriers zero through eleven during symbol zero) that occurs at the beginning of the uplink burst 900.

The UE 404 may map the PUSCH 914 in the uplink burst 900. In an aspect, the UE 404 may map the PUSCH 914 frequency first. That is, the UE 404 may map the PUSCH 914 on a frequency-basis (e.g., subcarrier-basis), such as subcarrier by subcarrier across symbols. In one aspect, the UE 404 may map the PUSCH 914 beginning with the symbol (e.g., symbol one) in a set of RBs immediately following the first symbol (e.g., symbol zero) to which the DMRS sequence 906 is mapped.

The UE 404 may map 424 the UCI, including the CQI 908, in a PUSCH 914 of the uplink burst 900. In various aspects, the UE 404 may map 424 the CQI 908 to the end of the PUSCH 914—e.g., the UE 404 may map the CQI 908 beginning at a last symbol of a set of RBs (e.g., symbol six of slot two/fourteenth symbol×subcarrier nine) of the PUSCH 914.

The UE 404 may map 424 the CQI 908 frequency first in the uplink burst 900—i.e., the UE 404 may map 424 the CQI 908 subcarrier by subcarrier across symbols. For example, the UE 404 may map 424 the CQI 908 beginning on the last subcarrier (e.g., subcarrier nine) and during the last symbol (e.g., symbol six of slot two/fourteenth symbol) of the set of RBs to which the PUSCH 914 is mapped. Continuing with the last symbol (e.g., symbol six of slot two/fourteenth symbol), the UE 404 may then map the CQI 908 to the next subcarrier (e.g., subcarrier eight), and so forth until the UE 404 reaches the first subcarrier (e.g., subcarrier zero) to which the CQI 908 is to be mapped. The UE 404 may map the CQI 908 to a next-to-last symbol (e.g., symbol five of slot two/thirteenth symbol) of the set of RBs to which the PUSCH 914 is mapped, and continue mapping the CQI 908 subcarrier by subcarrier until either the end of the CQI 908 or the last subcarrier is reached. In an aspect, the subcarriers for CQI may be non-contiguous in frequency. For example, the CQI may occupy even subcarriers.

The UE 404 may rate-match the PUSCH 914 around the mapped CQI 908. For example, the UE 404 may map the CQI 908, and then the UE 404 may map data (e.g., user data) to the PUSCH 914, and the UE 404 may rate-match the data in the PUSCH 914 around the CQI 908. In various aspects, one or more of the ACK/NACK feedback and/or the RI may be absent from the UCI mapped in the PUSCH 914.

Figure 10:
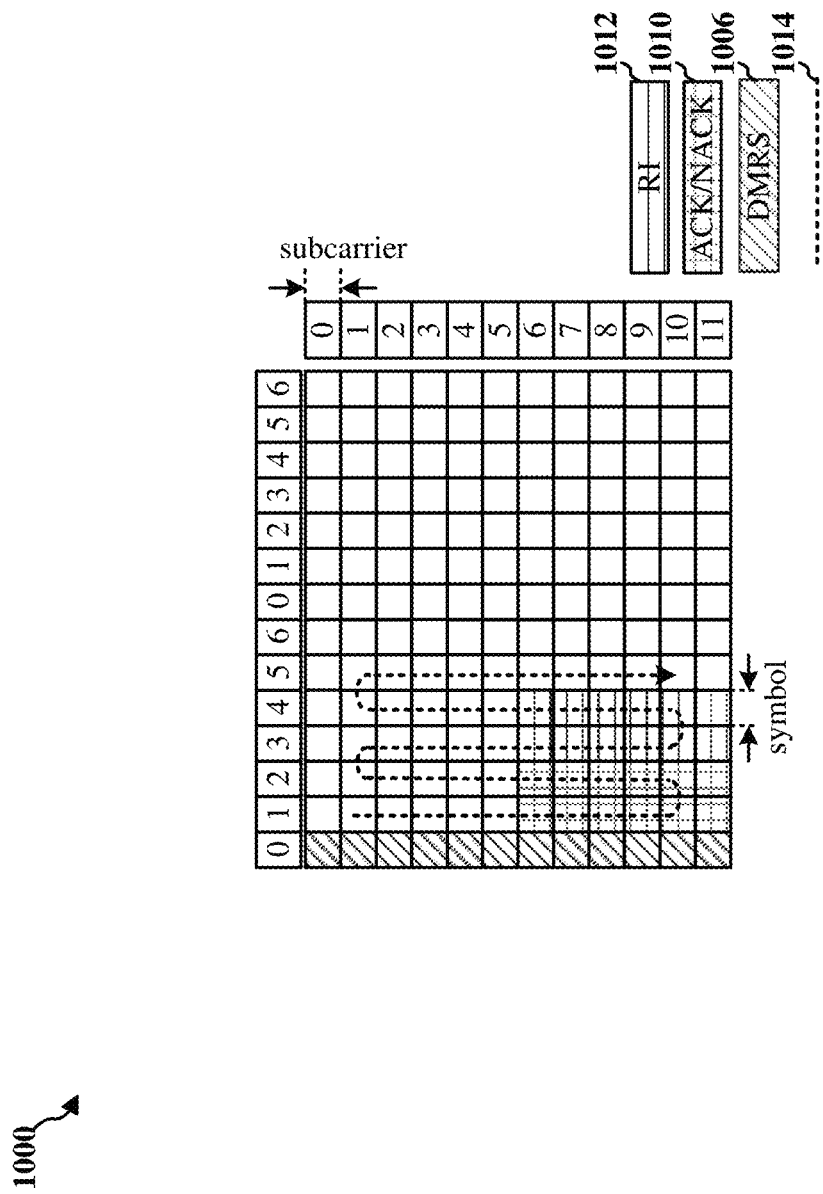
FIG. 10 is a diagram of an uplink burst.

FIG. 10 illustrates a uplink burst 1000 for sending UCI, which may include at least one of ACK/NACK feedback 1010 and/or an RI 1012. The uplink burst 1000 may be used, for example, in LTE systems and/or in 5G NR systems. For example, the uplink burst 1000 may be at least a portion of at least one subframe. In an aspect, the uplink burst 1000 may be an aspect of the uplink burst 420 illustrated in FIG. 4.

In the illustrated aspect, the DMRS sequence 1006 may be carried on a first symbol of a slot (e.g., symbol zero of the uplink burst 1000). In the context of FIG. 4, the UE 404 may map 422 the DMRS sequence 1006 to a first symbol (e.g., symbol zero) of a set of RBs (e.g., subcarriers zero through eleven during symbol zero) that occurs at the beginning of the uplink burst 1000.

The UE 404 may map the PUSCH 1014 in the uplink burst 1000. In an aspect, the UE 404 may map the PUSCH 1014 frequency first. That is, the UE 404 may map the PUSCH 1014 on a frequency-basis (e.g., subcarrier-basis), such as subcarrier by subcarrier across symbols. In one aspect, the UE 404 may map the PUSCH 1014 beginning with the symbol (e.g., symbol one) in a set of RBs immediately following the first symbol (e.g., symbol zero) to which the DMRS sequence 1006 is mapped.

The UE 404 may map 424 the UCI, including the ACK/NACK feedback 1010 and the RI 1012, in a PUSCH 1014 of the uplink burst 1000. In various aspects, the CQI may be absent from the UCI mapped in the PUSCH 1014.

In aspects, the UE 404 may map 424 the ACK/NACK feedback 1010 to a symbol of a second set of RBs immediately following the first symbol of the first set of RBs to which the DMRS sequence 1006 is mapped. For example, the UE 404 may map 424 the ACK/NACK feedback 1010 beginning at the second symbol (e.g., symbol one) and ending at the third symbol (e.g., symbol two), across a portion of the subcarriers (e.g., subcarriers six through eleven). The UE 404 may map 424 the ACK/NACK feedback 1010 frequency first, but the ACK/NACK feedback 1010 may only be mapped across a subset of the set of subcarriers. In an aspect, the subcarriers for ACK/NACK feedback may be non-contiguous in frequency. For example, ACK/NACK feedback may use even subcarriers. Where the ACK/NACK feedback 1010 occurs on the same RBs as the PUSCH 1014, the UE 404 may puncture the PUSCH 1014 with the ACK/NACK feedback 1010. For example, the UE 404 may map data (e.g., user data) in the PUSCH 1014, and the UE 404 may puncture that data with the ACK/NACK feedback 1010 in the PUSCH 1014. Alternatively, the UE 404 may rate match the PUSCH 1014 around the ACK/NACK feedback 1010. For example, the UE 404 may map the ACK/NACK feedback 1010, and then the UE 404 may map data (e.g., user data) to the PUSCH 1014, and the UE 404 may rate-match the data in the PUSCH 1014 around the ACK/NACK feedback 1010.

In aspects, the UE 404 may map 424 the RI 1012 to a symbol of a third set of RBs immediately following the last symbol of the second set of RBs to which the ACK/NACK feedback 1010 is mapped. For example, the UE 404 may map the RI 1012 beginning at the fourth symbol (e.g., symbol three) and ending at the fifth symbol (e.g., symbol four), across a portion of the subcarriers (e.g., subcarriers six through eleven). The UE 404 may map 424 the RI 1012 frequency first, but the RI 1012 may only be mapped across a subset of the set of subcarriers. Where the RI 1012 occurs on the same RBs as the PUSCH 1014, the UE 404 may puncture the PUSCH 1014 with the RI 1012. For example, the UE 404 may map data (e.g., user data) in the PUSCH 1014, and the UE 404 may puncture that data with the RI 1012 in the PUSCH 1014. Alternatively, the UE 404 may rate match the PUSCH 1014 around the RI 1012. For example, the UE 404 may map the RI 1012, and then the UE 404 may map data (e.g., user data) to the PUSCH 1014, and the UE 404 may rate-match the data in the PUSCH 1014 around the RI 1012.

While the uplink burst 1000 may provide the good performance for the ACK/NACK feedback 1010 and the RI 1012, the PUSCH 1014 may experience degraded performance due to the puncturing.

Figure 11:
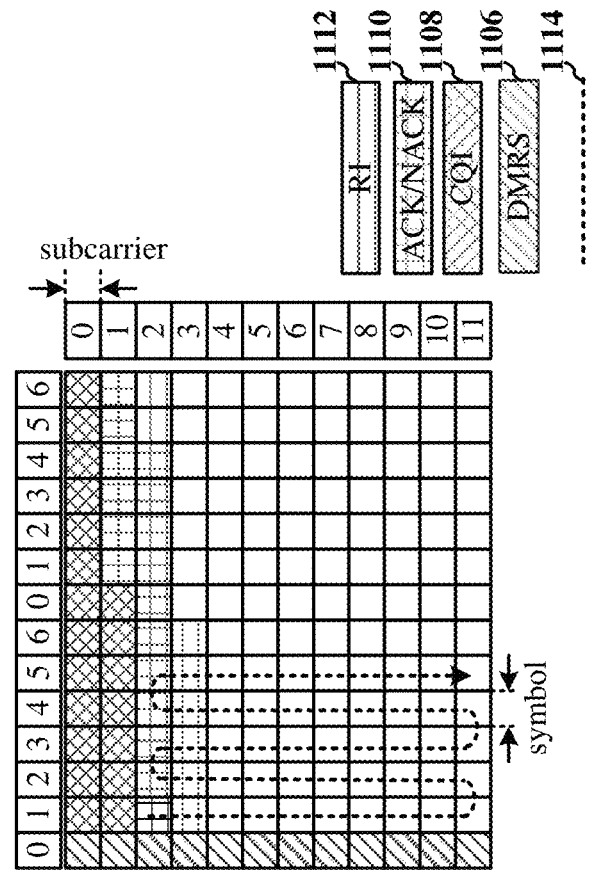
FIG. 11 is a diagram of an uplink burst.

FIG. 11 illustrates a uplink burst 1100 for sending UCI, which may include at least one of ACK/NACK feedback 1110 and/or an RI 1112. The uplink burst 1100 may be used, for example, in LTE systems and/or in 5G NR systems. For example, the uplink burst 1100 may be at least a portion of at least one subframe. In an aspect, the uplink burst 1100 may be an aspect of the uplink burst 420 illustrated in FIG. 4.

In the illustrated aspect, the DMRS sequence 1106 may be carried on a first symbol of a slot (e.g., symbol zero of the uplink burst 1100). In the context of FIG. 4, the UE 404 may map 422 the DMRS sequence 1106 to a first symbol (e.g., symbol zero) of a set of RBs (e.g., subcarriers zero through eleven during symbol zero) that occurs at the beginning of the uplink burst 1100.

The UE 404 may map the PUSCH 1114 in the uplink burst 1100. In an aspect, the UE 404 may map the PUSCH 1114 frequency first. That is, the UE 404 may map the PUSCH 1114 subcarrier by subcarrier across symbols. In one aspect, the UE 404 may map the PUSCH 1114 beginning with the symbol (e.g., symbol one) in a set of RBs immediately following the first symbol (e.g., symbol zero) to which the DMRS sequence 1106 is mapped.

The UE 404 may map 424 the UCI, including the CQI 1108 following the DMRS sequence 1106 in the uplink burst 1100—e.g., the UE 404 may map the CQI 1108 beginning at a first RB (e.g., symbol one×subcarrier zero) following the front-loaded DMRS sequence 706.

The UE 404 may map 424 the CQI 1108 time first in the uplink burst 1100—i.e., the UE 404 may map 424 the CQI 1108 on a time-basis (e.g., symbol-basis), such as symbol by symbol across subcarriers. For example, the UE 404 may map 424 the CQI 1108 beginning in the first symbol (e.g., symbol one) and the first subcarrier (e.g., subcarrier zero) of the set of RBs following the set of RBs to which the DMRS sequence 706 is mapped, and continuing to the next symbol on the first subcarrier.

The UE 404 may map 424 the UCI, including the ACK/NACK feedback 1110 and the RI 1112, in a PUSCH 1114 of the uplink burst 1100. The UE 404 may map 424 the ACK/NACK feedback 1110 time first—e.g., symbol by symbol across subcarriers. In aspects, the UE 404 may map 424 the ACK/NACK feedback 1110 beginning with a symbol of a set of RBs immediately following the last symbol of a set of RBs to which the CQI 1108 is mapped. For example, the UE 404 may map the ACK/NACK feedback 1110 beginning at the ninth symbol (e.g., symbol one of slot two) and continuing symbol by symbol across subcarriers until the ACK/NACK feedback 1010 is mapped. Where the ACK/NACK feedback 1110 occurs on the same RBs as the PUSCH 1114, the UE 404 may puncture the PUSCH 1114 with the ACK/NACK feedback 1110.

Similar to the ACK/NACK feedback 1110, the UE 404 may map 424 the RI 1112 time first—e.g., symbol by symbol across subcarriers. In aspects, the UE 404 may map 424 the RI 1112 to a symbol of a set of RBs immediately following the last symbol of the set of RBs to which the ACK/NACK feedback 1110 is mapped. For example, the UE 404 may map the RI 1112 beginning at the thirteenth symbol (e.g., symbol five of slot 2) and continuing symbol by symbol across subcarriers until the RI 1112 is mapped. Where the RI 1112 occurs on the same RBs as the PUSCH 1114, the UE 404 may puncture the PUSCH 1114 with the RI 1112.

In one aspect, the UE 404 may map 424 the ACK/NACK feedback 1110 at the beginning of the PUSCH 1114 (e.g., at the first RB of the PUSCH 1114). The UE 404 may map 424 the RI 1112 at an RB immediately following the last RB to which the ACK/NACK feedback 1110 is mapped.

Figure 12:
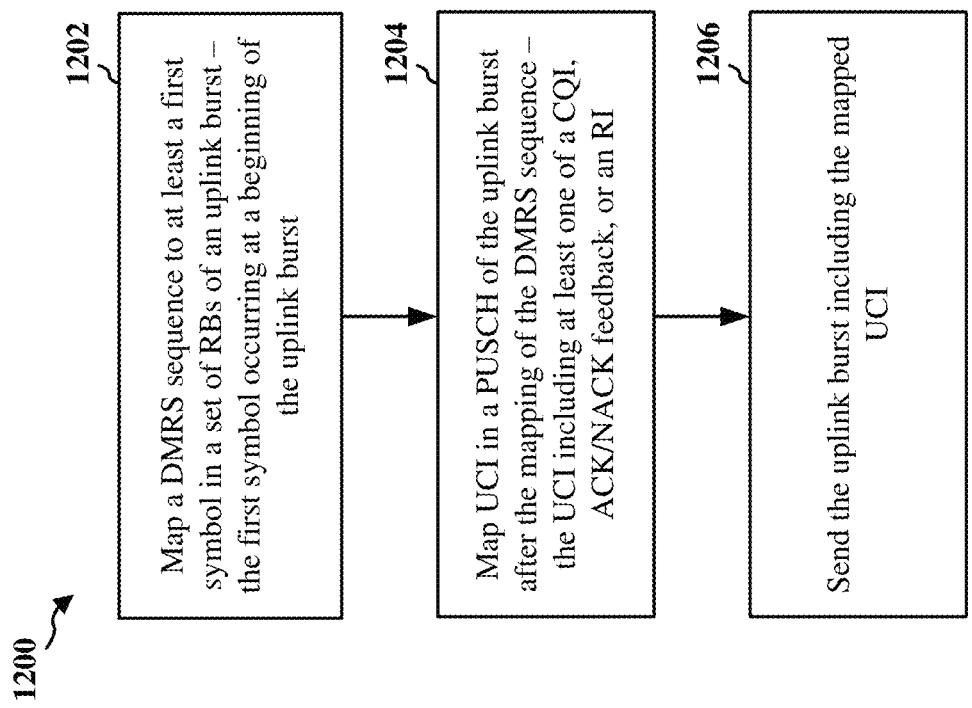
FIG. 12 is a flowchart of a method of wireless communication.

FIG. 12 is a flowchart of a method 1200 of wireless communication. The method 1200 may be performed by a UE (e.g., the UE 404, the apparatus 1502/1502'). In different aspects, one or more operations may be added, omitted, or contemporaneously performed.

At operation 1202, the UE may map a DMRS sequence to at least a first symbol in a set of RBs of an uplink burst. The first symbol may occur at the beginning of the uplink burst. For example, the UE may identify the first symbol of an uplink burst (e.g., symbol zero of slot one), and then the UE may map at least a portion of the DMRS sequence to that first symbol on one or more subcarriers of the uplink burst. In the context of FIG. 4, the UE 404 may map 422 the DMRS sequence to at least a first symbol in a set of RBs of an uplink burst 420. In the context of FIG. 5, a UE may map the DMRS sequence 506 to a first portion of an uplink burst 508.

At operation 1204, the UE may map UCI in a PUSCH of the uplink burst after mapping the DMRS sequence. The UCI may include at least one of a CQI, ACK/NACK feedback, and/or an RI. For example, the UE may determine at least one of a CQI (e.g., based on a measured SNR), ACK/NACK feedback (e.g., based on received downlink data and/or control information), and/or an RI (e.g., based on a measured SNR). The UE may identify one or more RBs corresponding to a PUSCH (e.g., based on scheduling/allocation information provided by the base station), and the UE may map at least a portion of at least one of the CQI, ACK/NACK feedback, and/or RI to at least a portion of the one or more RBs corresponding to the PUSCH. In the context of FIG. 4, the UE 404 may map 424 the UCI in a PUSCH of the uplink burst 420 after mapping 422 the DMRS sequence.

In one aspect, the UE may map the CQI to a beginning of the PUSCH. In one aspect, the UE may map the CQI before mapping the ACK/NACK feedback and/or the RI. In one aspect, the UE may map the ACK/NACK feedback before mapping the RI. In one aspect, the UE may map the CQI to a first set of symbols in the PUSCH and the UE may map the ACK/NACK feedback to a second set of symbols in the PUSCH that immediately follow the first set of symbols. In an aspect, the UE may puncture the ACK/NACK feedback and/or the RI in the PUSCH from the beginning of the PUSCH. For example, the UE may puncture the bits conveying the ACK/NACK feedback in the PUSCH beginning at a first symbol of the PUSCH (e.g., symbol one of slot one, following symbol zero to which the DMRS sequence is mapped), and continue puncturing the ACK/NACK feedback in subsequent symbols of the PUSCH. When the last bits conveying the ACK/NACK feedback are punctured into a symbol of the PUSCH, the UE may puncture bits corresponding to the RI in the next symbol of the PUSCH following the last symbol in which the ACK/NACK feedback is punctured. In another aspect, the UE may rate match the PUSCH around at least one of the ACK/NACK feedback or the RI. For example, the UE may map the at least one of the ACK/NACK feedback or RI and rate-match data (e.g., user data) in the PUSCH around the at least one of the ACK/NACK feedback or RI. In an aspect, the CQI may be absent from the UCI.

At operation 1206, the UE may send the uplink burst including the mapped UCI. For example, the UE may send the uplink burst to a base station, e.g., based on downlink data and/or control information. In the context of FIG. 4, the UE 404 may send, to the base station 402, the uplink burst 420 that includes the DMRS sequence and the UCI.

Figure 13:
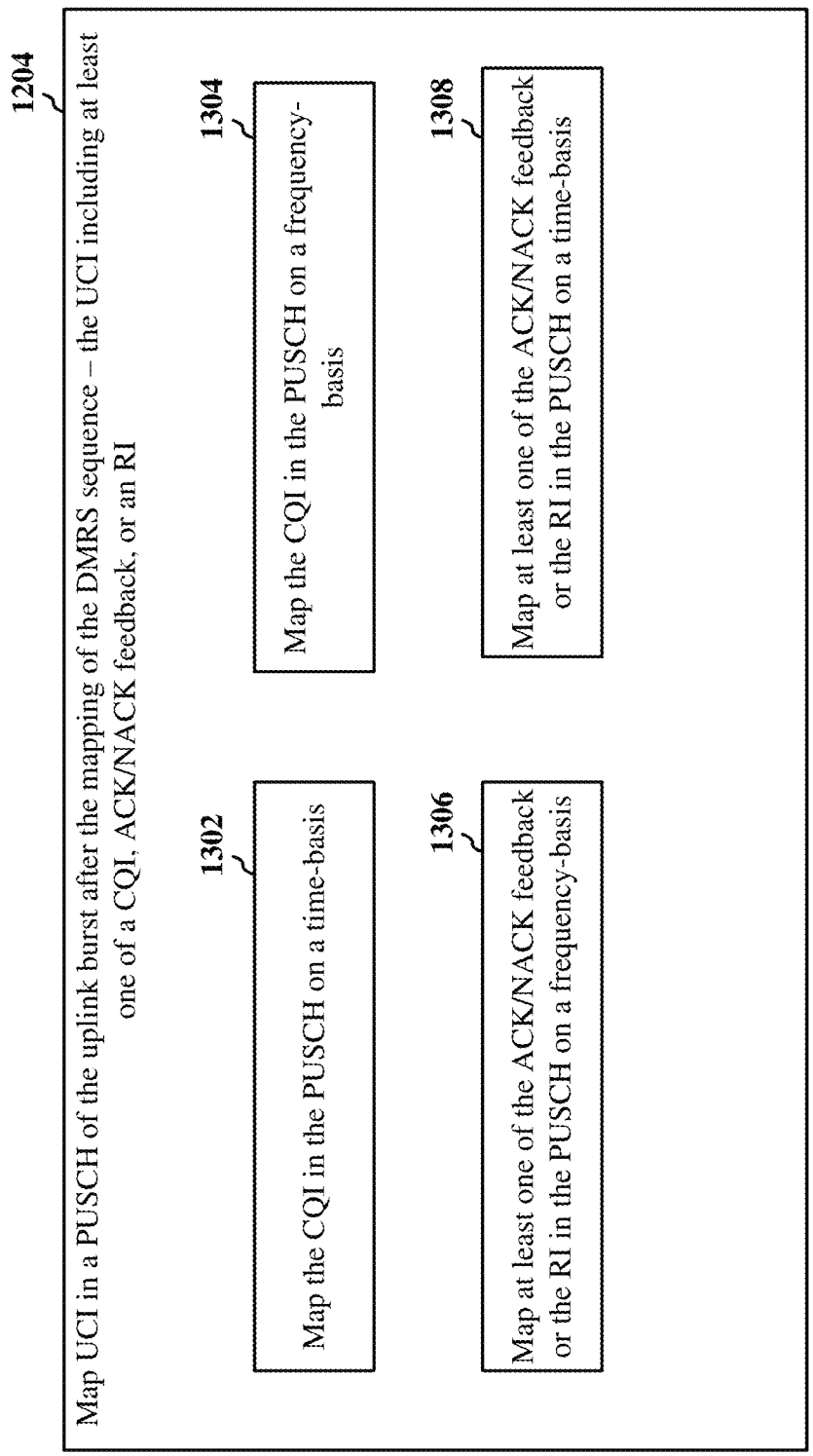
FIG. 13 is a flowchart of a method of wireless communication.

In various aspects, operation 1204 of FIG. 12 may include one or more operations 1302, 1304, 1306, 1308 illustrated in FIG. 13. Beginning first with operations 1302, the UE may map the CQI in the PUSCH on a time-basis (e.g., symbol-basis). That is, the UE may map the CQI time first. For example, the UE may map the CQI sequentially across symbols of a first subcarrier, beginning with a first symbol and proceeding across the next symbols of the first subcarrier. Subsequently, the UE may map the CQI sequentially across symbols of a second subcarrier (e.g., a subcarrier next to the first subcarrier), again beginning with the first symbol and proceeding across the next symbols of the second subcarrier. In the context of FIG. 7, the UE may map the CQI 708 at the beginning of the PUSCH 714—e.g., at a first RB (e.g., symbol one×subcarrier zero) of the PUSCH 714. The UE may then map the CQI 708 symbol by symbol for each subcarrier of the uplink burst 700 until the UE maps the CQI 708.

At operation 1304, the UE may map the CQI in the PUSCH on a frequency-basis (e.g., subcarrier-basis). That is, the UE may map the CQI in the PUSCH frequency first. For example, the UE may map the CQI across subcarriers of a first symbol, beginning with a first subcarrier and proceeding across the next subcarriers of the first symbol. Subsequently, the UE may map the CQI across subcarriers of a second symbol (e.g., the next symbol in time following the first symbol), again beginning with the first subcarrier and proceeding across the next subcarriers of the second symbol. In an aspect, the subcarriers for CQI may be non-contiguous in frequency, e.g., even subcarriers or odd subcarriers. In the context of FIG. 8, the UE may map the CQI 808 at the beginning of the PUSCH 814 subcarrier by subcarrier for each symbol of the uplink burst 800 until the UE maps the CQI 808. In the context of FIG. 9, the UE may map the CQI 908 at the end of the PUSCH 914 subcarrier by subcarrier for each symbol of the uplink burst 900 until the UE maps the CQI 908.

At operation 1306, the UE may map at least one of ACK/NACK feedback and/or RI in the PUSCH on a frequency basis. That is, the UE may map the at least one of the ACK/NACK feedback and/or the RI frequency first. For example, the UE may map the at least one of ACK/NACK feedback and/or RI across subcarriers of a first symbol, beginning with a first subcarrier and proceeding across the next subcarriers of the first symbol. Subsequently, the UE may map the at least one of ACK/NACK feedback and/or RI across subcarriers of a second symbol (e.g., the next symbol in time following the first symbol), again beginning with the first subcarrier and proceeding across the next subcarriers of the second symbol. In an aspect, the subcarriers for ACK/NACK feedback or RI may be non-contiguous in frequency, e.g., even or odd subcarriers. In the context of FIG. 10, the UE may map the ACK/NACK feedback 1010, subcarrier by subcarrier on a subset of the set of subcarriers, to a set of symbols immediately following the PUSCH 1014. The UE may puncture the PUSCH 1014 with the ACK/NACK feedback 1010. Additionally, the UE may map the RI 1012, subcarrier by subcarrier on the subset of the set of subcarriers, to a set of symbols immediately following the ACK/NACK feedback 1010. The UE may puncture the PUSCH 1014 with the RI 1012.

At operation 1308, the UE may map at least one of ACK/NACK feedback and/or RI in the PUSCH on a time-basis (e.g., symbol-basis). That is, the UE may map the at least one of the ACK/NACK feedback and/or the RI time first. For example, the UE may map the at least one of ACK/NACK feedback and/or RI sequentially across symbols of a first subcarrier, beginning with a first symbol and proceeding across the next symbols of the first subcarrier. Subsequently, the UE may map the at least one of ACK/NACK feedback and/or RI sequentially across symbols of a second subcarrier (e.g., a subcarrier next to the first subcarrier), again beginning with the first symbol and proceeding across the next symbols of the second subcarrier. In the context of FIG. 11, the UE may map the ACK/NACK feedback 1110, symbol by symbol across one or more subcarriers, beginning with a symbol immediately following the CQI 1108 or, if the CQI 1108 is absent, to a set of symbols immediately following the DMRS sequence 1106 (e.g., from the beginning of the PUSCH 1114). The UE may puncture the PUSCH 1114 with the ACK/NACK feedback 1110. Additionally, the UE may map the RI 1112, symbol by symbol on one or more subcarriers, beginning at a symbol immediately following the ACK/NACK feedback 1110. The UE may puncture the PUSCH 1114 with the RI 1112.

Figure 14:
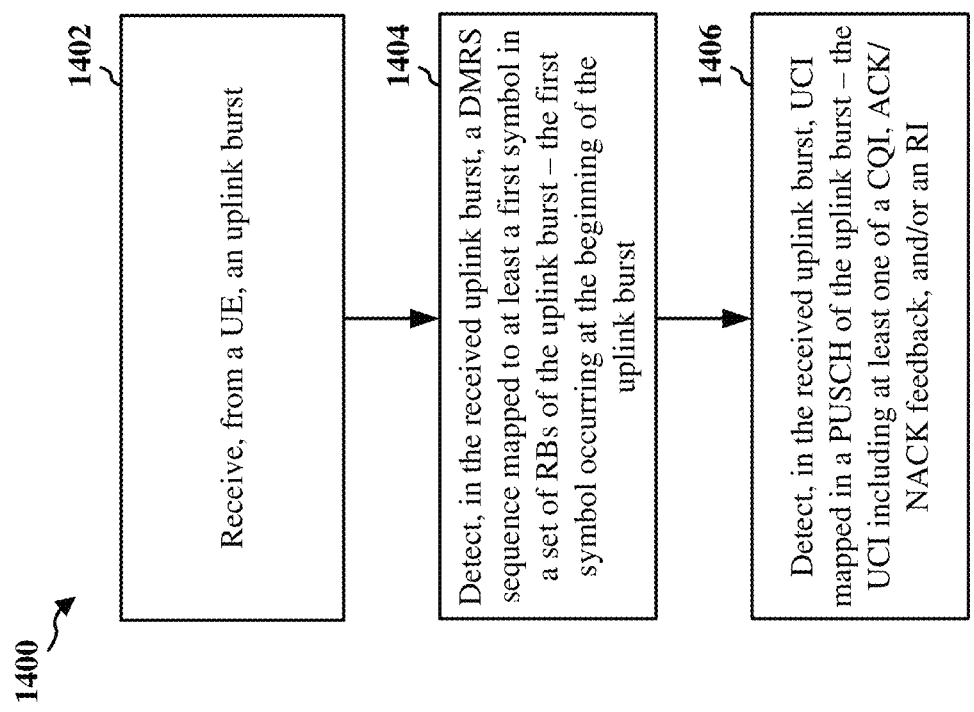
FIG. 14 is a flowchart of a method of wireless communication.

FIG. 14 is a flowchart of a method 1400 of wireless communication. The method 1400 may be performed by a base station (e.g., the base station 402, the apparatus 1602/1602'). In different aspects, one or more operations may be added, omitted, or contemporaneously performed.

At operation 1402, the base station may receive, from a UE, an uplink burst. For example, the base station may send downlink data and/or control information. Based on the downlink data and/or control information, the UE may send UCI on one or more scheduled resources. The base station may detect for uplink bursts on the one or more scheduled resources and may receive the uplink burst from the UE. In the context of FIG. 4, the base station 402 may receive, from the UE 404, the uplink burst 420.

At operation 1404, the base station may detect, in the received uplink burst, a DMRS sequence mapped to at least a first symbol in a set of RBs of the uplink burst. The first symbol may occur at the beginning of the uplink burst—e.g., the DMRS sequence may be front loaded in an uplink-centric signal. Because the DMRS sequence may be location dependent, the base station may quickly identify the beginning of an uplink burst (e.g., the first symbol of the first slot or symbol zero). The base station may then identify the DRMS sequence during the identified symbol on one or more subcarriers.

In the context of FIG. 4, the base station 402 may detect the 426 the DMRS sequence in the uplink burst 420. In the context of FIG. 5, the base station may detect the DMRS sequence 506 on a first portion of an uplink burst 508. In the context of FIG. 6, the base station may detect the DMRS sequence 606 occurring on a first symbol carried on the set of subcarriers of the uplink burst 600. In the context of FIG. 7, the base station may detect the DMRS sequence 706 occurring on a first symbol carried on the set of subcarriers of the uplink burst 700. In the context of FIG. 8, the base station may detect the DMRS sequence 806 occurring on a first symbol carried on the set of subcarriers of the uplink burst 800. In the context of FIG. 9, the base station may detect the DMRS sequence 906 occurring on a first symbol carried on the set of subcarriers of the uplink burst 900. In the context of FIG. 10, the base station may detect the DMRS sequence 1006 occurring on a first symbol carried on the set of subcarriers of the uplink burst 1000. In the context of FIG. 11, the base station may detect the DMRS sequence 1106 occurring on a first symbol carried on the set of subcarriers of the uplink burst 1100.

At operation 1406, the base station may detect, in the received uplink burst, UCI mapped in a PUSCH of the uplink burst. In aspects, the UCI may include at least one of a CQI, ACK/NACK feedback, and/or an RI. For example, the base station may identify one or more resources in the uplink burst that are to carry UCI, which may correspond to one or more resources of the PUSCH. The base station may then identify at least one of CQI, ACK/NACK feedback, and/or an RI on the one or more identified resources. In the context of FIG. 4, the base station 402 may detect 428 UCI mapped in a PUSCH of the uplink burst 420.

In one aspect, the CQI is in the PUSCH on a time-basis (e.g., symbol-basis), beginning at the beginning of the PUSCH. For example, the CQI may be mapped sequentially across symbols of a first subcarrier, beginning with a first symbol and proceeding across the next symbols of the first subcarrier. Additionally, the CQI may be mapped sequentially across symbols of a second subcarrier (e.g., a subcarrier next to the first subcarrier), again beginning with the first symbol and proceeding across the next symbols of the second subcarrier. In the context of FIG. 7, the base station may detect the CQI 708 time first occurring at one or more symbols over one or more subcarriers, beginning at a first RB (e.g., symbol one×subcarrier zero) of the PUSCH 714.

In one aspect, the CQI is mapped in the PUSCH on a frequency-basis. For example, the CQI may be mapped across subcarriers of a first symbol, beginning with a first subcarrier and proceeding across the next subcarriers of the first symbol. Additionally, the CQI may be mapped across subcarriers of a second symbol (e.g., a symbol following the first symbol in time), again beginning with the first subcarrier and proceeding across the next subcarriers of the second symbol. In one aspect, the CQI may be mapped beginning at the beginning of the PUSCH. In the context of FIG. 8, the base station may detect the CQI 808 frequency first on one or more subcarriers occurring over one or more symbols, beginning at a first RB (e.g., symbol one×subcarrier zero) of the PUSCH 814. In another aspect, the CQI is may be mapped beginning at the end of the PUSCH. In the context of FIG. 9, the base station may detect the CQI 908 frequency first on one or more subcarriers occurring over one or more symbols, beginning at a lase RB (e.g., symbol six of slot two/fourteenth symbol of the uplink burst 900×subcarrier nine) of the PUSCH 914. In an aspect, the subcarriers for CQI may be non-contiguous in frequency, e.g., even or odd subcarriers.

In one aspect, at least one of the ACK/NACK feedback or the RI is mapped on a frequency-basis, such as subcarrier by subcarrier across symbols (e.g., frequency first). For example, the at least one of the ACK/NACK feedback or the RI may be mapped across subcarriers of a first symbol, beginning with a first subcarrier and proceeding across the next subcarriers of the first symbol. Additionally, the at least one of the ACK/NACK feedback or the RI may be mapped across subcarriers of a second symbol (e.g., a symbol following the first symbol in time), again beginning with the first subcarrier and proceeding across the next subcarriers of the second symbol. In the context of FIG. 10, the base station may detect the ACK/NACK feedback 1010, subcarrier by subcarrier on a subset of the set of subcarriers, occurring during a set of symbols immediately following the DMRS sequence 1006. The ACK/NACK feedback 1010 may be punctured in the PUSCH 1014. Additionally, the base station may detect the RI 1012, subcarrier by subcarrier on the subset of the set of subcarriers, occurring during a set of symbols immediately following the ACK/NACK feedback 1010. The RI 1012 may be punctured in the PUSCH 1014. Alternatively, the PUSCH may be rate-matched around at least one of ACK/NACK feedback or RI (e.g., at least a portion of other data to be carried on the PUSCH may be rate-matched around the ACK/NACK feedback or RI). In an aspect, the subcarriers for ACK/NACK feedback or RI may be non-contiguous in frequency, e.g., even or odd subcarriers.

In one aspect, at least one of the ACK/NACK feedback or the RI is mapped on a time-basis (e.g., symbol-basis), such as symbol by symbol across subcarriers (e.g., time first). For example, the at least one of the ACK/NACK feedback or the RI may be mapped sequentially across symbols of a first subcarrier, beginning with a first symbol and proceeding across the next symbols of the first subcarrier. Additionally, the at least one of the ACK/NACK feedback or the RI may be mapped sequentially across symbols of a second subcarrier (e.g., a subcarrier next to the first subcarrier), again beginning with the first symbol and proceeding across the next symbols of the second subcarrier. In the context of FIG. 11, the base station may detect the ACK/NACK feedback 1110, occurring symbol by symbol across one or more subcarriers, beginning with a symbol immediately following the CQI 1108 or, if the CQI 1108 is absent, beginning during a set of symbols immediately following the DMRS sequence 1106 (e.g., from the beginning of the PUSCH 1114). The ACK/NACK feedback 1110 may be punctured in the PUSCH 1114. Alternatively, the PUSCH 1114 may be rate-matched around the ACK/NACK feedback 1110 (e.g., at least a portion of other data to be carried on the PUSCH 1114 may be rate-matched around the ACK/NACK feedback 1110). Additionally, the base station may detect the RI 1112, occurring symbol by symbol across one or more subcarriers, beginning with a symbol immediately following the ACK/NACK feedback 1110. The RI 1112 may be punctured in the PUSCH 1114. Alternatively, the PUSCH 1114 may be rate-matched around the RI 1112 (e.g., at least a portion of other data to be carried on the PUSCH 1114 may be rate-matched around the RI 1112).

Figure 15:
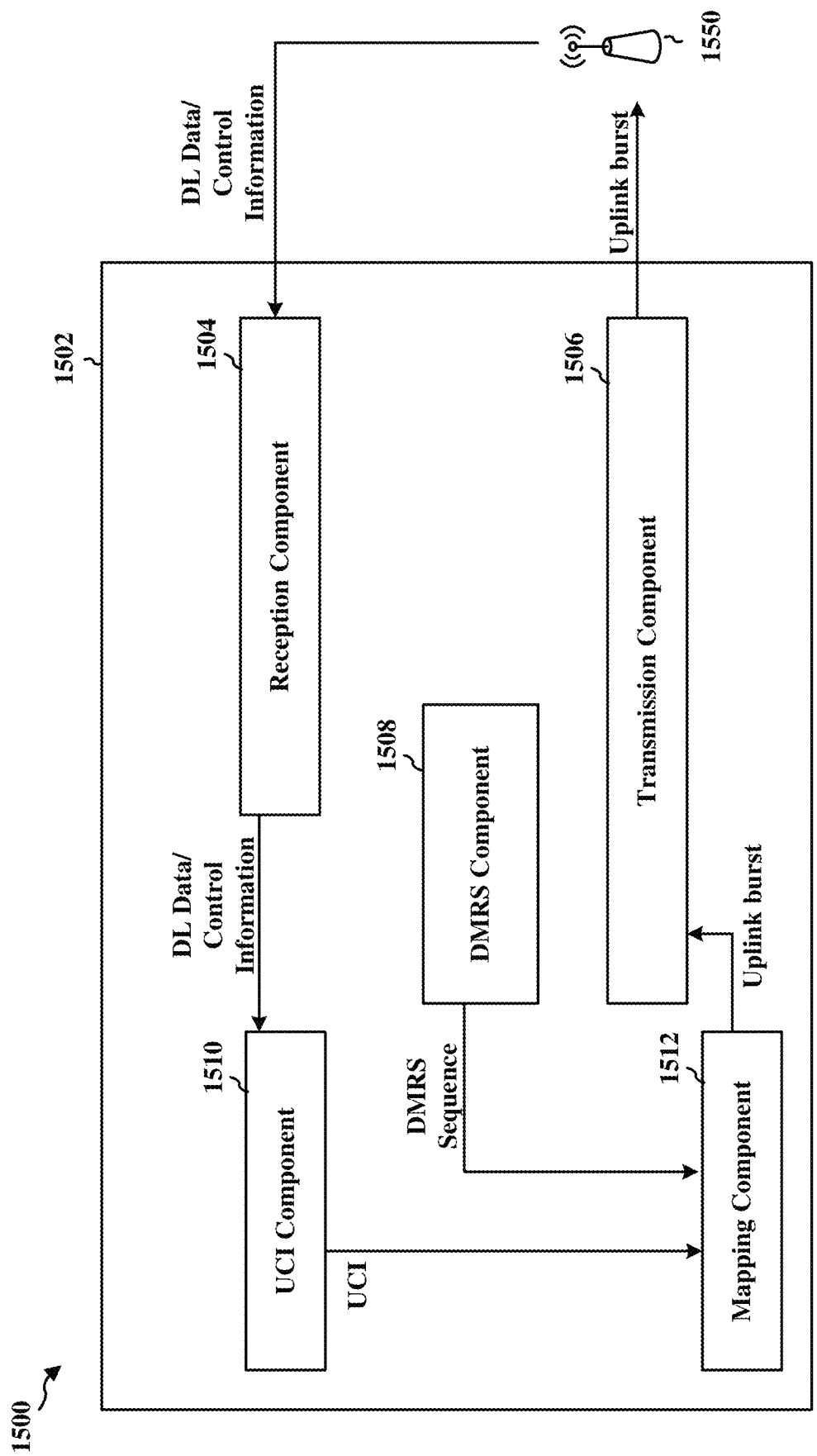
FIG. 15 is a conceptual data flow diagram illustrating the data flow between different means/components in an exemplary apparatus.

FIG. 15 is a conceptual data flow diagram 1500 illustrating the data flow between different means/components in an exemplary apparatus 1502. The apparatus may be a UE. The apparatus 1502 depicts exemplary connections and/or data between different modules/means/components. One of ordinary skill will appreciate that such connections and/or data flow are to be regarded in as illustrative and, therefore, different and/or additional connections and/or data flow may be present in different aspects.

The apparatus 1502 may include a reception component 1504. The reception component 1504 may receive signals from a base station (e.g., the base station 1550). The apparatus 1502 may further include a transmission component 1506. The transmission component 1506 may be configured to transmit signals to a base station (e.g., the base station 1550).

The apparatus 1502 may include a UCI component 1510. The UCI component 1510 may receive, through the reception component 1504, downlink data and/or control information from the base station 1550. Based on the downlink data and/or control information, the UCI component 1510 may determine UCI. For example, the UCI component 1510 may determine at least one of a CQI, ACK/NACK feedback, and/or an RI. The UCI component 1510 may provide the UCI (e.g., the at least one of the CQI, the ACK/NACK feedback, and/or the RI) to a mapping component 1512.

The apparatus 1502 may further include a DMRS component 1508. The DMRS component 1508 may be configured to determine a DMRS sequence. In one aspect, the DMRS component 1508 may be configured to determine the DMRS as a segment of another sequence. In one aspect, the DMRS component 1508 may determine the DRMS sequence based on a ZC sequence. The DMRS component 1508 may provide the DMRS sequence to the mapping component 1512.

In various aspects, the mapping component 1512 may be configured to first map the DMRS. The mapping component 1512 may map the DMRS sequence to at least a first symbol in a set of RBs of an uplink burst, and the first symbol may occur at the beginning of the uplink burst.

In one aspect, the mapping component 1512 may be configured to map a PUSCH in the uplink burst. For example, the mapping component 1512 may map the PUSCH frequency first—e.g., on a frequency-basis (e.g., subcarrier basis), such as subcarrier by subcarrier across symbols.

After mapping the DMRS sequence, the mapping component 1512 may be configured to map the UCI at least partially in a PUSCH of the uplink burst. For example, the mapping component 1512 may map at least a portion of the CQI, the ACK/NACK feedback, and/or the RI in a PUSCH.

In one aspect, the mapping component 1512 may map the CQI on a frequency-basis, such as subcarrier by subcarrier across symbols in the PUSCH (e.g., frequency first). In another aspect, the mapping component 1512 may map the CQI on a time basis, such as symbol by symbol across subcarriers in the PUSCH (e.g., time first). In another aspect, the mapping component 1512 may map at least one of ACK/NACK feedback and/or RI on a frequency-basis, such as subcarrier by subcarrier across symbols in the PUSCH (e.g., frequency first). In another aspect, the mapping component 1512 may map at least one of ACK/NACK feedback and/or RI on a time-basis (e.g., symbol-basis), such as symbol by symbol across subcarriers in the PUSCH (e.g., time first). In an aspect, the subcarriers for at least one of the ACK/NACK feedback, the RI, or the CQI may be non-contiguous in frequency, e.g., even or odd subcarriers.

In one aspect, the mapping component 1512 may map the CQI before mapping the ACK/NACK feedback and/or the RI. In one aspect, the mapping component 1512 may map the ACK/NACK feedback before mapping the RI. In one aspect, the mapping component 1512 may map the CQI to a first set of symbols in the PUSCH (e.g., beginning with a symbol immediately following the DMRS sequence), and the mapping component 1512 may map the ACK/NACK feedback to a second set of symbols in the PUSCH, the second set of symbols immediately following the first set of symbols.

In an aspect, the mapping component 1512 may puncture the ACK/NACK feedback in the PUSCH, e.g., at the beginning of the PUSCH. The mapping component 1512 may puncture the RI in the PUSCH after the ACK/NACK feedback. In an aspect, the mapping component 1512 may rate match the PUSCH around at least one of the ACK/NACK feedback or the RI (e.g., the mapping component 1512 may rate-match at least a portion of other data to be carried on the PUSCH around the at least one of the ACK/NACK feedback or the RI). In an aspect, the CQI may be absent from the UCI.

The apparatus may include additional components that perform each of the blocks of the algorithm in the aforementioned flowcharts of FIGS. 12-13. As such, each block in the aforementioned flowcharts of FIGS. 12-13 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

Figure 16:
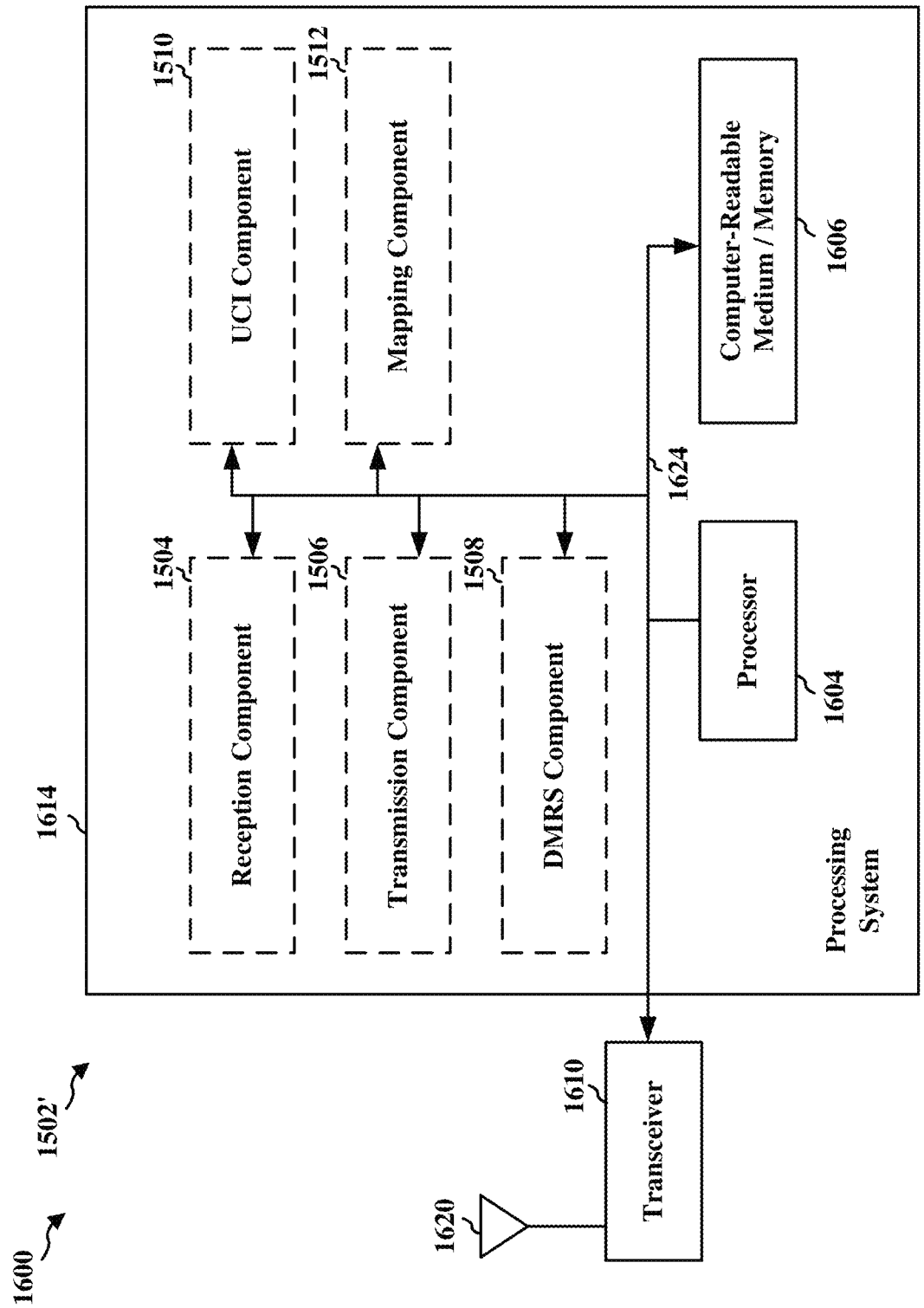
FIG. 16 is a diagram illustrating an example of a hardware implementation for an apparatus employing a processing system.

FIG. 16 is a diagram 1600 illustrating an example of a hardware implementation for an apparatus 1502' employing a processing system 1614. The processing system 1614 may be implemented with a bus architecture, represented generally by the bus 1624. The bus 1624 may include any number of interconnecting buses and bridges depending on the specific application of the processing system 1614 and the overall design constraints. The bus 1624 links together various circuits including one or more processors and/or hardware components, represented by the processor 1604, the components 1504, 1506, 1508, 1510, 1512, and the computer-readable medium/memory 1606. The bus 1624 may also link various other circuits such as timing sources, peripherals, voltage regulators, and power management circuits, which are well known in the art, and therefore, will not be described any further.

The processing system 1614 may be coupled to a transceiver 1610. The transceiver 1610 is coupled to one or more antennas 1620. The transceiver 1610 provides a means for communicating with various other apparatus over a transmission medium. The transceiver 1610 receives a signal from the one or more antennas 1620, extracts information from the received signal, and provides the extracted information to the processing system 1614, specifically the reception component 1504. In addition, the transceiver 1610 receives information from the processing system 1614, specifically the transmission component 1506, and based on the received information, generates a signal to be applied to the one or more antennas 1620. The processing system 1614 includes a processor 1604 coupled to a computer-readable medium/memory 1606. The processor 1604 is responsible for general processing, including the execution of software stored on the computer-readable medium/memory 1606. The software, when executed by the processor 1604, causes the processing system 1614 to perform the various functions described supra for any particular apparatus. The computer-readable medium/memory 1606 may also be used for storing data that is manipulated by the processor 1604 when executing software. The processing system 1614 further includes at least one of the components 1504, 1506, 1508, 1510, 1512. The components may be software components running in the processor 1604, resident/stored in the computer readable medium/memory 1606, one or more hardware components coupled to the processor 1604, or some combination thereof. The processing system 1614 may be a component of the UE 350 and may include the memory 360 and/or at least one of the TX processor 368, the RX processor 356, and the controller/processor 359.

In one configuration, the apparatus 1502/1502' for wireless communication includes means for mapping a DMRS sequence to at least a first symbol in a set of RBs of an uplink long burst, the first symbol occurring at a beginning of the uplink long burst. The apparatus 1502/1502' may include means for mapping UCI in a PUSCH of the uplink long burst after the mapping of the DMRS sequence, the UCI including at least one of a CQI, ACK/NACK feedback, or an RI. The apparatus 1502/1502' may include means for sending the uplink long burst including the mapped UCI.

In an aspect, the means for mapping the UCI in the PUSCH of the uplink burst is configured to map the CQI in the PUSCH on a frequency-basis. In an aspect, the CQI is mapped to an end of the PUSCH. In an aspect, the means for mapping the UCI in the PUSCH of the uplink long burst is configured to map the CQI in the PUSCH on a time-basis (e.g., symbol-basis). In an aspect, the CQI is mapped to a beginning of the PUSCH.

In an aspect, the means for mapping the UCI in the PUSCH of the uplink long burst is configured to map at least one of the ACK/NACK feedback or the RI in the PUSCH on a frequency-basis. In an aspect, the means for mapping the UCI in the PUSCH of the uplink long burst is configured to map the ACK/NACK feedback or the RI in the PUSCH on a time-basis (e.g., symbol-basis). In an aspect, the RI is mapped after the ACK/NACK feedback. In an aspect, at least one of the ACK/NACK feedback or the RI is mapped after the CQI in the PUSCH. In an aspect, the CQI is mapped to a first set of symbols in the PUSCH and the ACK/NACK feedback is mapped to a second set of symbols in the PUSCH, the second set of symbols immediately following the first set of symbols. In an aspect, the PUSCH is punctured from a beginning of the PUSCH with at least one of the ACK/NACK feedback or the RI. In an aspect, data in the PUSCH is rate-matched around at least one of the ACK/

NACK feedback or the RI. In an aspect, the PUSCH comprises at least one of a CP-OFDM waveform or an SC-ODFM waveform. In an aspect, a DFT is applied to one or more symbols of the uplink burst for the SC-OFDM waveform.

The aforementioned means may be one or more of the aforementioned components of the apparatus 1502 and/or the processing system 1614 of the apparatus 1502' configured to perform the functions recited by the aforementioned means. As described supra, the processing system 1614 may include the TX Processor 368, the RX Processor 356, and the controller/processor 359. As such, in one configuration, the aforementioned means may be the TX Processor 368, the RX Processor 356, and the controller/processor 359 configured to perform the functions recited by the aforementioned means.

Figure 17:
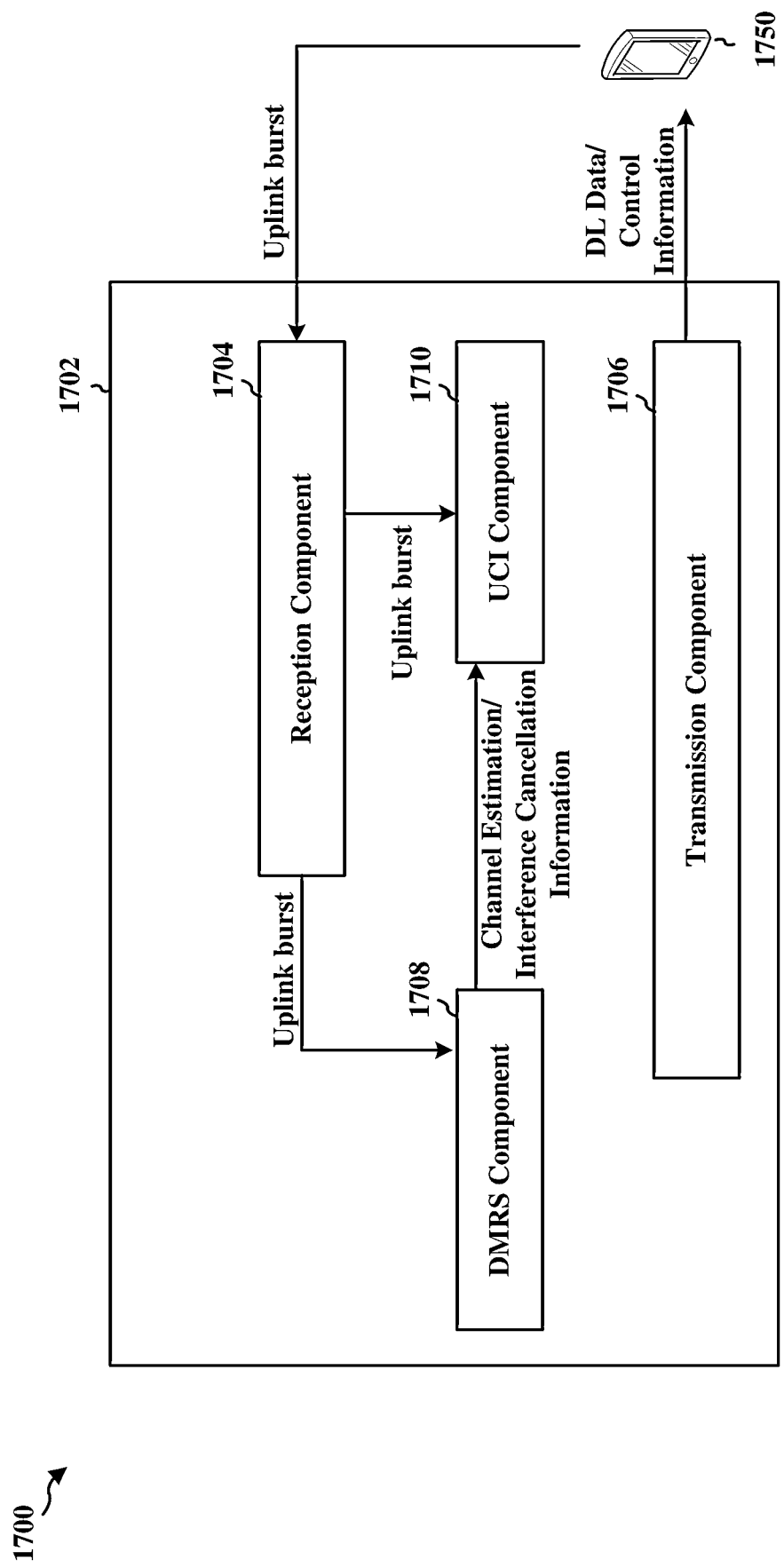
FIG. 17 is a conceptual data flow diagram illustrating the data flow between different means/components in an exemplary apparatus.

FIG. 17 is a conceptual data flow diagram 1700 illustrating the data flow between different means/components in an exemplary apparatus 1702. The apparatus may be a base station. The apparatus 1702 depicts exemplary connections and/or data between different modules/means/components. One of ordinary skill will appreciate that such connections and/or data flow are to be regarded in as illustrative and, therefore, different and/or additional connections and/or data flow may be present in different aspects.

The apparatus 1702 may include a reception component 1704. The reception component 1704 may receive signals from a UE (e.g., the UE 1750). The apparatus 1702 may further include a transmission component 1706. The transmission component 1706 may be configured to transmit signals to a UE (e.g., the UE 1750).

The reception component 1704 may receive, from the UE 1750, at least one uplink burst (e.g., at least a portion of at least one subframe), such as an uplink long burst. The reception component 1704 may provide the at least one uplink burst to a DMRS component 1708 and a UCI component 1710.

The DMRS component 1708 may be configured to detect, in the received uplink burst, a DMRS sequence. In an aspect, the DMRS component 1708 may detect the DMRS sequence mapped to at least a first symbol in a set of RBs of the uplink burst, and the first symbol may occur at the beginning of the uplink burst. In other words, the DMRS sequence may be front loaded in the uplink burst. The DMRS component 1708 may detect the DMRS sequence based on the location of the RBs (e.g., the DMRS sequence may be location dependent). In various aspects, the DMRS component 1708 may perform channel estimation and, if necessary, interference cancellation for a PUSCH in the uplink burst. The DMRS component 1708 may provide this information to the UCI component 1710.

The UCI component 1710 may be configured to detect, in the received uplink burst, UCI mapped in the PUSCH of the uplink burst. The UCI may include at least one of a CQI, ACK/NACK feedback, and/or an RI. In an aspect, the CQI may be mapped on a time-basis (e.g., symbol-basis), such as symbol by symbol across subcarriers in the PUCSH (e.g., mapped time first). In another aspect, the CQI may be mapped on a frequency-basis, such as subcarrier by subcarrier across symbols in the PUSCH (e.g., mapped frequency first). In an aspect, at least one of the ACK/NACK feedback and/or the RI may be mapped on a time-basis (e.g., symbol-basis), such as symbol by symbol across subcarriers in the PUCSH (e.g., mapped time first). In another aspect, at least one of the ACK/NACK feedback and/or the RI may be mapped on a frequency-basis, such as subcarrier by subcarrier across symbols in the PUSCH (e.g., mapped frequency first). In an aspect, the at least one of the ACK/NACK feedback or the RI is punctured in the PUSCH at the beginning of the PUSCH. In an aspect, the subcarriers for at least one of the ACK/NACK feedback, the RI or the CQI may be non-contiguous in frequency, e.g., even or odd subcarriers.

The apparatus may include additional components that perform each of the blocks of the algorithm in the aforementioned flowcharts of FIG. 14. As such, each block in the aforementioned flowcharts of FIG. 14 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

Figure 18:
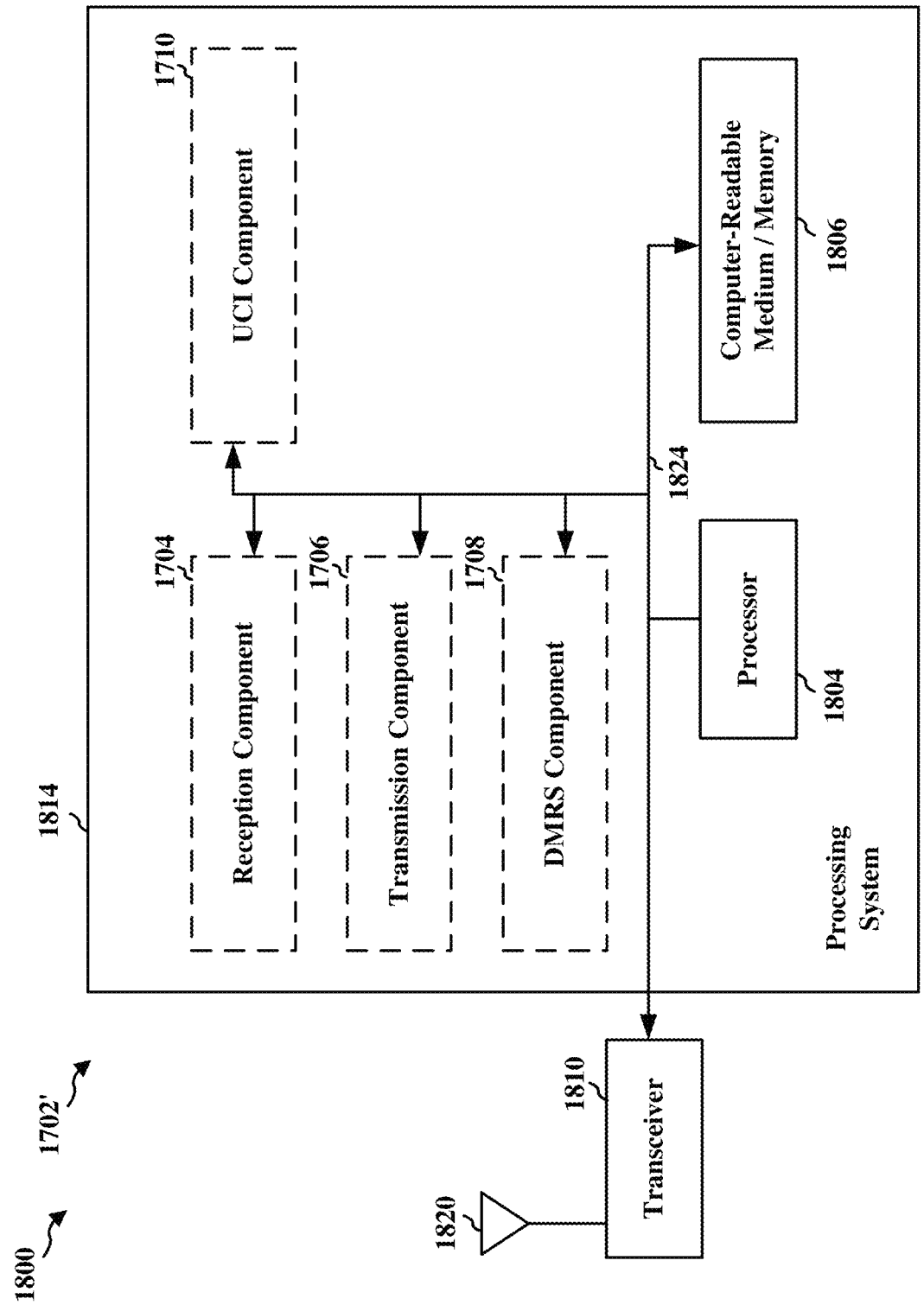
FIG. 18 is a diagram illustrating an example of a hardware implementation for an apparatus employing a processing system.

FIG. 18 is a diagram 1800 illustrating an example of a hardware implementation for an apparatus 1702' employing a processing system 1814. The processing system 1814 may be implemented with a bus architecture, represented generally by the bus 1824. The bus 1824 may include any number of interconnecting buses and bridges depending on the specific application of the processing system 1814 and the overall design constraints. The bus 1824 links together various circuits including one or more processors and/or hardware components, represented by the processor 1804, the components 1704, 1706, 1708, 1710, and the computer-readable medium/memory 1806. The bus 1824 may also link various other circuits such as timing sources, peripherals, voltage regulators, and power management circuits, which are well known in the art, and therefore, will not be described any further.

The processing system 1814 may be coupled to a transceiver 1810. The transceiver 1810 is coupled to one or more antennas 1820. The transceiver 1810 provides a means for communicating with various other apparatus over a transmission medium. The transceiver 1810 receives a signal from the one or more antennas 1820, extracts information from the received signal, and provides the extracted information to the processing system 1814, specifically the reception component 1704. In addition, the transceiver 1810 receives information from the processing system 1814, specifically the transmission component 1706, and based on the received information, generates a signal to be applied to the one or more antennas 1820. The processing system 1814 includes a processor 1804 coupled to a computer-readable medium/memory 1806. The processor 1804 is responsible for general processing, including the execution of software stored on the computer-readable medium/memory 1806. The software, when executed by the processor 1804, causes the processing system 1814 to perform the various functions described supra for any particular apparatus. The computer-readable medium/memory 1806 may also be used for storing data that is manipulated by the processor 1804 when executing software. The processing system 1814 further includes at least one of the components 1704, 1706, 1708, 1710. The components may be software components running in the processor 1804, resident/stored in the computer readable medium/memory 1806, one or more hardware components coupled to the processor 1804, or some combination thereof. The processing system 1814 may be a component of the base station 310 and may include the memory 376 and/or at least one of the TX processor 316, the RX processor 370, and the controller/processor 375.

In one configuration, the apparatus 1702/1702' for wireless communication includes means for receiving, from a UE, an uplink long burst. The apparatus 1702/1702' may further include means for detecting, in the received uplink long burst, a DMRS sequence mapped to at least a first symbol in a set of RBs of the uplink long burst, the first symbol occurring at a beginning of the uplink long burst. The apparatus 1702/1702' may further include means for detecting, in the received uplink long burst, UCI mapped in a PUSCH of the uplink long burst, the UCI including at least one of a CQI, ACK/NACK feedback, or an RI. In an aspect, the CQI is mapped in the PUSCH on a time-basis (e.g., symbol-basis). In an aspect, the CQI is mapped in the PUSCH on a frequency-basis. In an aspect, at least one of the ACK/NACK feedback or the RI is mapped in the PUSCH on a time-basis (e.g., symbol-basis). In an aspect, at least one of the ACK/NACK feedback or the RI is mapped in the PUSCH on a frequency-basis. In an aspect, the PUSCH is punctured from a beginning of the PUSCH with at least one of the ACK/NACK feedback or the RI.

The aforementioned means may be one or more of the aforementioned components of the apparatus 1702 and/or the processing system 1814 of the apparatus 1702' configured to perform the functions recited by the aforementioned means. As described supra, the processing system 1814 may include the TX Processor 316, the RX Processor 370, and the controller/processor 375. As such, in one configuration, the aforementioned means may be the TX Processor 316, the RX Processor 370, and the controller/processor 375 configured to perform the functions recited by the aforementioned means.

It is understood that the specific order or hierarchy of blocks in the processes/flowcharts disclosed is an illustration of exemplary approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

What is claimed is:

1. A method of wireless communication by a user equipment (UE), the method comprising:
   mapping a demodulation reference signal (DMRS) sequence to at least a first symbol in a set of resource blocks (RBs) of a slot in an uplink burst, the first symbol occurring at a beginning of the slot, the DMRS sequence being dependent on a location of an RB associated with the uplink burst;
   mapping uplink control information (UCI) in a physical uplink shared channel (PUSCH) of the uplink burst after the mapping of the DMRS sequence, the UCI including a channel quality indicator (CQI) mapped in the PUSCH frequency first, wherein the UCI that is mapped in the PUSCH of the uplink burst further comprises acknowledgment/non-acknowledgement (ACK/NACK) feedback, wherein the PUSCH is punctured from a beginning of the PUSCH with the ACK/NACK feedback, and wherein data in the PUSCH is rate-matched around the ACK/NACK feedback; and
   sending the uplink burst including the mapped UCI.

2. The method of claim 1, wherein the CQI is mapped to an end of the PUSCH.

3. The method of claim 1, wherein the CQI is mapped to a beginning of the PUSCH.

4. The method of claim 1, wherein the UCI that is mapped in the PUSCH of the uplink burst further comprises a rank indicator (RI).

5. The method of claim 4, wherein the mapping the UCI in the PUSCH comprises: mapping at least one of the ACK/NACK feedback or the RI in the PUSCH on a frequency-basis.

6. The method of claim 4, wherein the mapping the UCI in the PUSCH comprises:
   mapping the ACK/NACK feedback or the RI in the PUSCH on a time-basis.

7. The method of claim 4, wherein the RI is mapped after the ACK/NACK feedback.

8. The method of claim 4, wherein at least one of the ACK/NACK feedback or the RI is mapped after the CQI in the PUSCH.

9. The method of claim 8, wherein the CQI is mapped to a first set of symbols in the PUSCH and the ACK/NACK feedback is mapped to a second set of symbols in the PUSCH, the second set of symbols immediately following the first set of symbols.

10. The method of claim 4, wherein data in the PUSCH is further rate-matched around the RI.

11. The method of claim 1, wherein the PUSCH comprises at least one of a cyclic prefix (CP) orthogonal frequency division multiplex (OFDM) waveform or a single carrier (SC) OFDM waveform.

12. The method of claim 11, wherein a discrete Fourier transform (DFT) is applied to one or more symbols of the uplink burst for the SC OFDM waveform.

13. A method of wireless communication by a base station, the method comprising:
    receiving, from a user equipment (UE), an uplink burst;

detecting, in the received uplink burst, a demodulation reference signal (DMRS) sequence mapped to at least a first symbol in a set of resource blocks (RBs) of a slot in the uplink burst, the first symbol occurring at a beginning of the slot, the DMRS sequence being dependent on a location of an RB associated with the uplink burst; and detecting, in the received uplink burst, uplink control information (UCI) mapped in a physical uplink shared channel (PUSCH) of the uplink burst, the UCI including a channel quality indicator (CQI) mapped in the PUSCH frequency first, wherein the UCI that is mapped in the PUSCH of the uplink burst further comprises acknowledgment/non-acknowledgement (ACK/NACK) feedback, wherein the PUSCH is punctured from a beginning of the PUSCH with the ACK/NACK feedback, and wherein data in the PUSCH is rate-matched around the ACK/NACK feedback.

14. The method of claim 13, wherein the UCI that is mapped in the PUSCH of the uplink burst further comprises a rank indicator (RI).

15. The method of claim 14, wherein at least one of the ACK/NACK feedback or the RI is mapped in the PUSCH on a time-basis.

16. The method of claim 14, wherein at least one of the ACK/NACK feedback or the RI is mapped in the PUSCH on a frequency-basis.

17. The method of claim 14, wherein the PUSCH is punctured from a beginning of the PUSCH with the RI, or data in the PUSCH is further rate-matched around the RI.

18. An apparatus for wireless communication, the apparatus comprising:
one or more memories; and
one or more processors coupled to the one or more memories and the one or more processors, individually or in combination, being configured to:
map a demodulation reference signal (DMRS) sequence to at least a first symbol in a set of resource blocks (RBs) of a slot in an uplink burst, the first symbol occurring at a beginning of the slot, the DMRS sequence being dependent on a location of an RB associated with the uplink burst;
map uplink control information (UCI) in a physical uplink shared channel (PUSCH) of the uplink burst after the mapping of the DMRS sequence, the UCI including a channel quality indicator (CQI) mapped in the PUSCH frequency first, wherein the UCI that is mapped in the PUSCH of the uplink burst further comprises acknowledgment/non-acknowledgement (ACK/NACK) feedback, wherein the PUSCH is punctured from a beginning of the PUSCH with the ACK/NACK feedback, and wherein data in the PUSCH is rate-matched around the ACK/NACK feedback; and
send the uplink burst including the mapped UCI.

19. The apparatus of claim 18, wherein the UCI that is mapped in the PUSCH of the uplink burst further comprises a rank indicator (RI).

20. The apparatus of claim 19, wherein the one or more processors, individually or in combination, are configured to map the UCI in the PUSCH by mapping at least one of the ACK/NACK feedback or the RI in the PUSCH on a time-basis.

21. The apparatus of claim 19, wherein the one or more processors, individually or in combination, are configured to map the UCI in the PUSCH by mapping the ACK/NACK feedback or the RI in the PUSCH on a frequency-basis.

22. The apparatus of claim 19, wherein the RI is mapped after the ACK/NACK feedback.

23. The apparatus of claim 19, wherein the PUSCH is punctured from a beginning of the PUSCH with the RI, or wherein data in the PUSCH is further rate-matched around the RI.

24. An apparatus for wireless communication, the apparatus comprising:
one or more memories; and
one or more processors coupled to the one or more memories and the one or more processors, individually or in combination, being configured to:
receive, from a user equipment (UE), an uplink burst;
detect, in the received uplink burst, a demodulation reference signal (DMRS) sequence mapped to at least a first symbol in a set of resource blocks (RBs) of a slot in the uplink burst, the first symbol occurring at a beginning of the slot, the DMRS sequence being dependent on a location of an RB associated with the uplink burst; and
detect, in the received uplink burst, uplink control information (UCI) mapped in a physical uplink shared channel (PUSCH) of the uplink burst, the UCI including a channel quality indicator (CQI) mapped in the PUSCH frequency first, wherein the UCI that is mapped in the PUSCH of the uplink burst further comprises acknowledgment/non-acknowledgement (ACK/NACK) feedback, wherein the PUSCH is punctured from a beginning of the PUSCH with the ACK/NACK feedback, and wherein data in the PUSCH is rate-matched around the ACK/NACK feedback.

25. The apparatus of claim 24, wherein the UCI that is mapped in the PUSCH of the uplink burst further comprises a rank indicator (RI).

26. The apparatus of claim 25, wherein at least one of the ACK/NACK feedback or the RI is mapped in the PUSCH on a time-basis or a frequency-basis.

27. The apparatus of claim 25, wherein the data in the PUSCH is further rate-matched around the RI.

* * * * *